US011046251B2

(12) United States Patent
De Wind et al.

(10) Patent No.: US 11,046,251 B2
(45) Date of Patent: Jun. 29, 2021

(54) INTERIOR REARVIEW MIRROR WITH GDO MODULE

(71) Applicant: MAGNA MIRRORS OF AMERICA, INC., Holland, MI (US)

(72) Inventors: Darryl P. De Wind, West Olive, MI (US); John T. Uken, Jenison, MI (US); Christopher R. Koetje, Zeeland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 246 days.

(21) Appl. No.: 16/088,963

(22) PCT Filed: Mar. 28, 2017

(86) PCT No.: PCT/IB2017/051760
§ 371 (c)(1),
(2) Date: Sep. 27, 2018

(87) PCT Pub. No.: WO2017/168316
PCT Pub. Date: Oct. 5, 2017

(65) Prior Publication Data
US 2020/0324703 A1    Oct. 15, 2020

Related U.S. Application Data

(63) Continuation-in-part of application No. 15/511,842, filed as application No. PCT/US2015/050904 on Sep. 18, 2015, now Pat. No. 10,189,411.
(Continued)

(51) Int. Cl.
*B60R 1/12* (2006.01)
*B60Q 3/258* (2017.01)
(Continued)

(52) U.S. Cl.
CPC ............ *B60R 1/1207* (2013.01); *B60Q 3/258* (2017.02); *B60R 1/04* (2013.01); *F21V 23/0464* (2013.01);
(Continued)

(58) Field of Classification Search
CPC ... B60Q 3/51; B60Q 3/53; B60Q 3/57; B60Q 3/59; B60Q 3/62; B60Q 3/64;
(Continued)

(56) References Cited

U.S. PATENT DOCUMENTS

| 4,862,594 A | 9/1989 | Schierbeek et al. |
| 4,937,945 A | 7/1990 | Schofield et al. |

(Continued)

FOREIGN PATENT DOCUMENTS

| EP | 0689963 A1 | 1/1996 |
| EP | 1777108 A1 | 4/2007 |

(Continued)

OTHER PUBLICATIONS

U.S. Appl. No. 62/030,846 (Year: 2014).*
International Search Report and Written Opinion dated Mar. 28, 2017 from corresponding PCT Application No. PCT/IB2017/051760.

*Primary Examiner* — Rajarshi Chakraborty
*Assistant Examiner* — Steven Y Horikoshi
(74) *Attorney, Agent, or Firm* — Honigman LLP

(57) ABSTRACT

An interior rearview mirror assembly for a vehicle includes a mirror head, a mirror mounting structure configured to adjustably mount the mirror head at an interior portion of the vehicle, and a receiving portion for receiving a portable self-contained garage door opening module. The portable module includes a user input and a housing, and is operable to wirelessly transmit a radio frequency signal responsive to actuation of the user input of the portable module. With the
(Continued)

portable module received at the receiving portion of the interior rearview mirror assembly, the user input is accessible by a driver of the vehicle. A retaining element is configured to attach to the mirror casing at the receiving portion to releasably secure the portable module at the receiving portion.

26 Claims, 29 Drawing Sheets

Related U.S. Application Data

(60) Provisional application No. 62/396,544, filed on Sep. 19, 2016, provisional application No. 62/314,585, filed on Mar. 29, 2016, provisional application No. 62/198,887, filed on Jul. 30, 2015, provisional application No. 62/158,839, filed on May 8, 2015, provisional application No. 62/156,635, filed on May 4, 2015, provisional application No. 62/065,232, filed on Oct. 17, 2014, provisional application No. 62/062,478, filed on Oct. 10, 2014, provisional application No. 62/052,523, filed on Sep. 19, 2014.

(51) Int. Cl.
*B60R 1/04* (2006.01)
*F21V 23/04* (2006.01)
*G08B 5/36* (2006.01)
*F21Y 115/10* (2016.01)
*E05F 15/77* (2015.01)
*F21W 106/00* (2018.01)

(52) U.S. Cl.
CPC ........ *G08B 5/36* (2013.01); *B60R 2001/1284* (2013.01); *E05F 15/77* (2015.01); *E05Y 2400/85* (2013.01); *E05Y 2900/106* (2013.01); *F21W 2106/00* (2018.01); *F21Y 2115/10* (2016.08)

(58) Field of Classification Search
CPC ............ B60Q 3/258; B60R 2011/0033; B60R 2011/0035; B60R 2011/0043–0047; B60R 2011/0059; B60R 2011/0078; B60R 2011/0082; B60R 2011/0084; B60R 2011/0264; B60R 2011/0294; B60R 7/00; B60R 7/04; B60R 7/05; B60R 7/08; B60R 2011/0071; B60R 2011/0075; B60R 1/04; B60R 1/12; B60R 1/1207; B60R 2001/1215–1292
See application file for complete search history.

(56) References Cited

U.S. PATENT DOCUMENTS

| | | |
|---|---|---|
| 5,131,154 A | 7/1992 | Schierbeek et al. |
| 5,255,442 A | 10/1993 | Schierbeek et al. |
| 5,455,716 A | 10/1995 | Suman et al. |
| 5,632,092 A | 5/1997 | Blank et al. |
| 5,667,176 A | 9/1997 | Zamarripa et al. |
| 5,680,263 A | 10/1997 | Zimmermann et al. |
| 5,708,415 A | 1/1998 | Van Lente et al. |
| 5,798,688 A | 8/1998 | Schofield |
| 5,854,593 A | 12/1998 | Dykema et al. |
| 5,924,212 A | 7/1999 | Domanski |
| 5,971,552 A | 10/1999 | O'Farrell et al. |
| 6,091,343 A | 7/2000 | Dykema et al. |
| 6,172,613 B1 | 1/2001 | DeLine et al. |
| 6,243,003 B1 | 6/2001 | DeLine et al. |
| 6,278,377 B1 | 8/2001 | DeLine et al. |
| 6,347,872 B1 | 2/2002 | Brechbill et al. |
| 6,362,771 B1 | 3/2002 | Schofield et al. |
| 6,396,408 B2 | 5/2002 | Drummond et al. |
| 6,420,975 B1 | 7/2002 | DeLine et al. |
| 6,428,172 B1 | 8/2002 | Hutzel et al. |
| 6,477,464 B2 | 11/2002 | McCarthy et al. |
| 6,485,081 B1 | 11/2002 | Bingle et al. |
| 6,678,614 B2 | 1/2004 | McCarthy et al. |
| 6,728,375 B1 | 4/2004 | Palett et al. |
| 6,902,284 B2 | 6/2005 | Hutzel et al. |
| 6,946,978 B2 | 9/2005 | Schofield |
| 6,998,977 B2 | 2/2006 | Gregori et al. |
| 7,004,593 B2 | 2/2006 | Weller et al. |
| 7,012,727 B2 | 3/2006 | Hutzel et al. |
| 7,023,322 B2 | 4/2006 | Baumgardner et al. |
| 7,098,411 B1 * | 8/2006 | McConnell ............ H01H 13/83 200/310 |
| 7,167,796 B2 | 1/2007 | Taylor et al. |
| 7,293,888 B2 | 11/2007 | Hutzel et al. |
| 7,308,341 B2 | 12/2007 | Schofield et al. |
| 7,324,261 B2 | 1/2008 | Tonar et al. |
| 7,657,052 B2 | 2/2010 | Larson et al. |
| 7,734,392 B2 | 6/2010 | Schofield et al. |
| 8,421,591 B2 | 4/2013 | Karasek |
| 8,508,831 B2 | 8/2013 | De Wind et al. |
| 8,547,055 B2 | 10/2013 | Mack |
| 8,577,549 B2 | 11/2013 | Schofield et al. |
| 8,779,910 B2 | 7/2014 | DeLine et al. |
| 8,922,356 B2 | 12/2014 | Lambert et al. |
| 10,189,411 B2 | 1/2019 | De Wind et al. |
| 2002/0140289 A1 | 10/2002 | McConnell et al. |
| 2004/0057131 A1 | 3/2004 | Hutzel et al. |
| 2004/0239482 A1 | 12/2004 | Fitzgibbon |
| 2005/0134983 A1 | 6/2005 | Lynam |
| 2006/0050018 A1 | 3/2006 | Hutzel et al. |
| 2006/0164230 A1 * | 7/2006 | DeWind ................ B60K 35/00 340/461 |
| 2006/0255960 A1 * | 11/2006 | Uken ...................... B60R 11/02 340/815.4 |
| 2011/0121148 A1 | 5/2011 | Pernia |
| 2014/0015976 A1 | 1/2014 | DeLine et al. |
| 2014/0111320 A1 | 4/2014 | Holt et al. |
| 2014/0117757 A1 | 5/2014 | Tsui et al. |
| 2014/0366105 A1 | 12/2014 | Bradley et al. |
| 2015/0002262 A1 | 1/2015 | Geerlings et al. |
| 2015/0049500 A1 * | 2/2015 | Sakarian ................ F21L 4/08 362/486 |
| 2015/0321611 A1 * | 11/2015 | Lock ........................ B60R 1/04 359/267 |
| 2016/0037664 A1 * | 2/2016 | Hendricks ............ H05K 5/0204 361/814 |
| 2016/0288647 A1 | 10/2016 | Baur |
| 2017/0297497 A1 | 10/2017 | De Wind et al. |

FOREIGN PATENT DOCUMENTS

| | | |
|---|---|---|
| KR | 101584021 B1 | 1/2016 |
| WO | 2016/044706 A1 | 3/2016 |

* cited by examiner

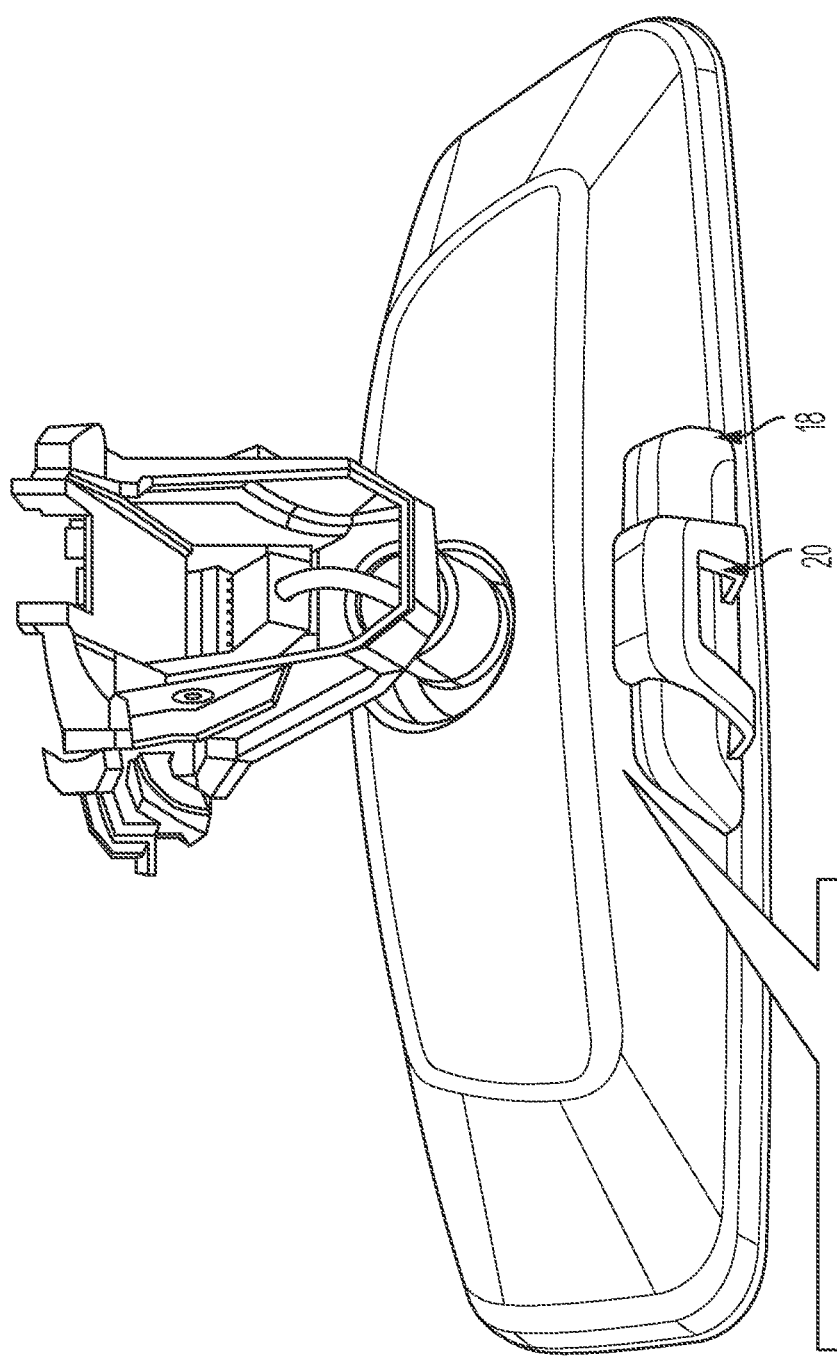

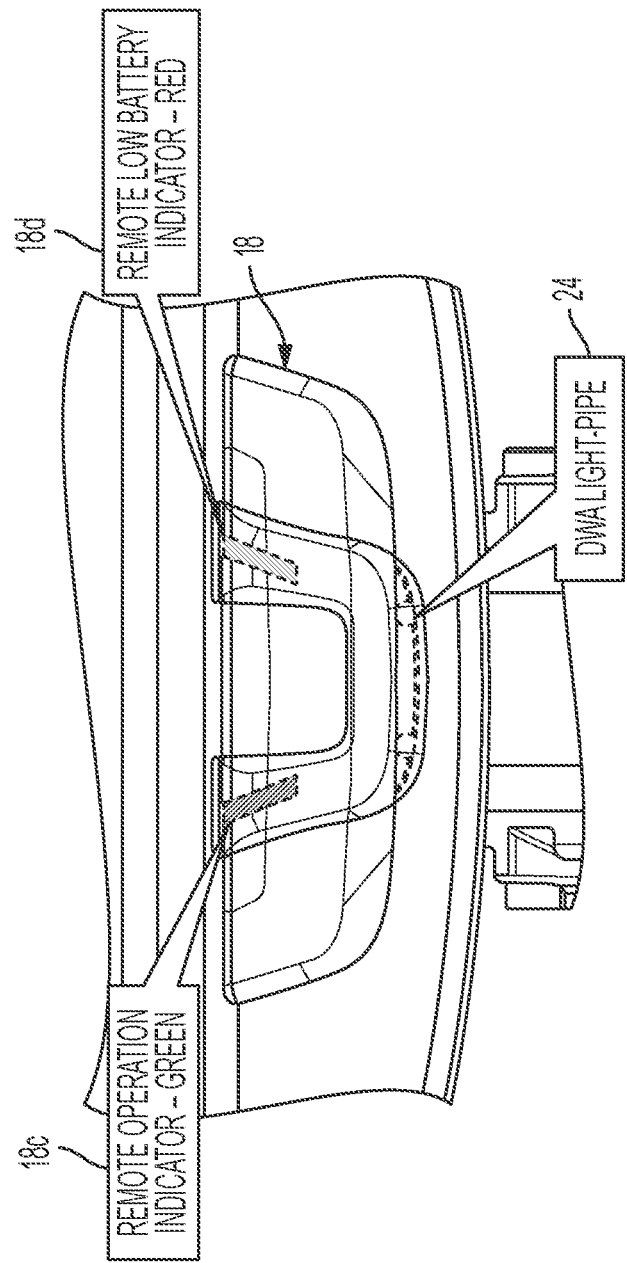
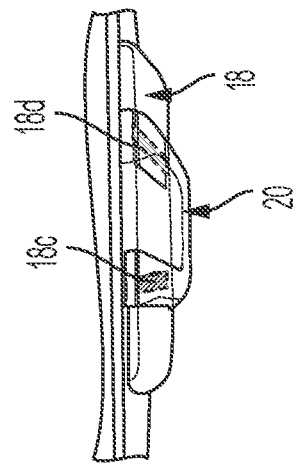
FIG. 14
FIG. 15

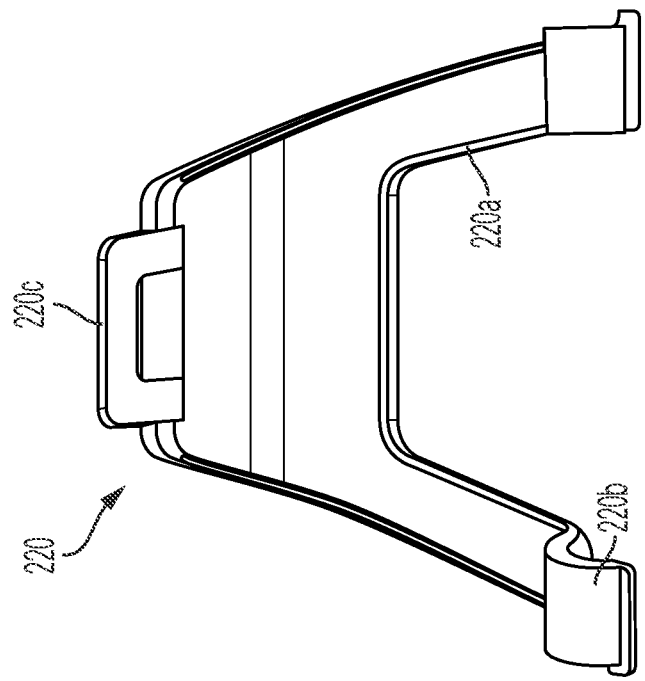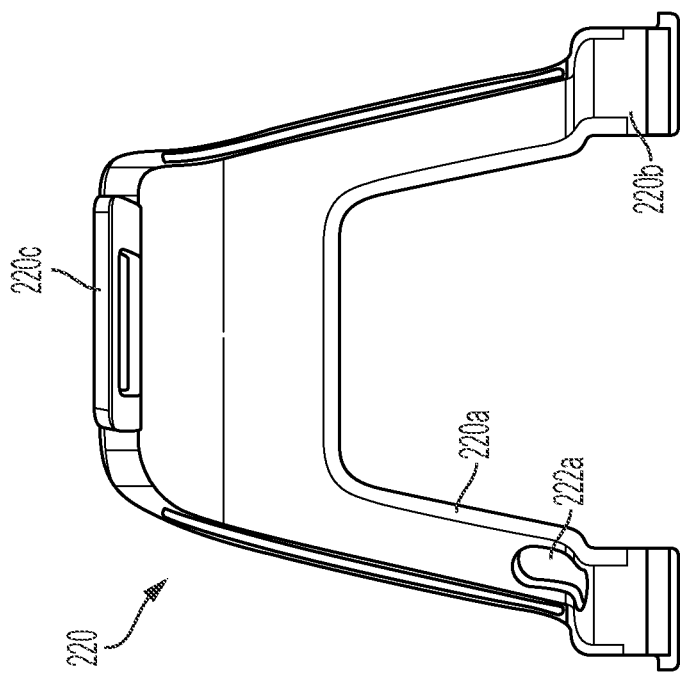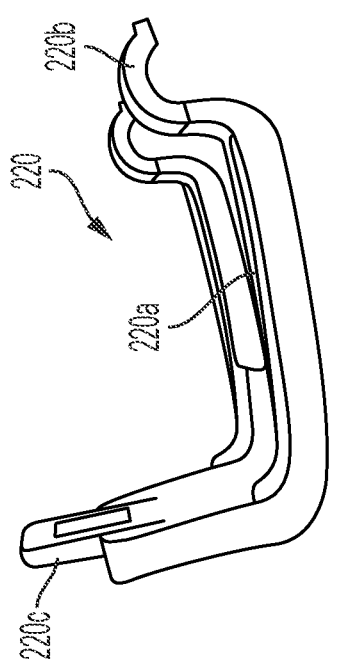

INTERIOR REARVIEW MIRROR WITH GDO MODULE

The present application is a 371 national phase filing of PCT Application No. PCT/IB2017/051760, filed Mar. 28, 2017, which claims the filing benefits of U.S. provisional applications, Ser. No. 62/396,544, filed Sep. 19, 2016, and Ser. No. 62/314,585, filed Mar. 29, 2016, which are hereby incorporated herein by reference in their entireties. The present application is also a continuation-in-part of U.S. patent application Ser. No. 15/511,842, filed Mar. 16, 2017, which is a 371 national phase filing of PCT Application No. PCT/US2015/050904, filed Sep. 18, 2015, which claims the filing benefits of U.S. provisional applications, Ser. No. 62/198,887, filed Jul. 30, 2015, Ser. No. 62/158,839, filed May 8, 2015, Ser. No. 62/156,635, filed May 4, 2015, Ser. No. 62/065,232, filed Oct. 17, 2014, Ser. No. 62/062,478, filed Oct. 10, 2014, and Ser. No. 62/052,523, filed Sep. 19, 2014.

FIELD OF THE INVENTION

The present invention relates generally to the field of interior rearview mirror assemblies for vehicles and, more particularly, with an interior rearview mirror assembly that includes a garage door opening function or feature.

BACKGROUND OF THE INVENTION

It is known to provide a mirror assembly that includes a garage door opener incorporated therein. For example, the HOMELINK® system may be incorporated into the rearview mirror. Examples of such systems are described in U.S. Pat. Nos. 6,396,408; 6,172,613; 6,091,343; 5,854,593 and 5,708,415.

SUMMARY OF THE INVENTION

The present invention provides an interior rearview mirror assembly that has a detachable self-contained, battery-powered garage door opening module or unit that is disposed at or in or at least partially in an interior rearview mirror assembly of a vehicle. The self-contained garage door opening module includes a battery or integrated power source, a transmitter (for transmitting a signal to actuate a garage door opener at a garage), circuitry and one or more user inputs or buttons. The garage door opening module is configured to be inserted at least partially into a receiving portion of the mirror casing of the mirror assembly, such that the user inputs or buttons are viewable and accessible and actuatable at an exterior portion of the mirror casing.

The detachable self-contained battery operated garage door opening module, when detached from the interior rearview mirror assembly, is portable by the owner of the vehicle or another user of the vehicle. For example, the detachable self-contained battery operated garage door opening module can be detached from the interior rearview mirror assembly and can be carried by a user for use external and distant from the vehicle or can be inserted into another interior rearview mirror assembly in another vehicle. Thus, when, for example, the vehicle owner sells his or her vehicle, the owner may detach the subject garage door opening module for use in another vehicle, thereby enhancing utility of the detachable self-contained battery operated garage door opening module and also enhancing security, given that the original vehicle can now be sold or otherwise disposed of without integrated inclusion therein of the subject garage door opening module.

The detachable self-contained battery operated garage door opening module may also include an indicator (such as a light emitting diode or the like) that is illuminated or activated when one or more of the buttons is pressed to indicate to the user that the garage door opening module is activated (and optionally to indicate to the user that the garage door opening module is learning or is ready to learn the appropriate code for controlling the selected garage door opener at the user's garage).

These and other objects, advantages, purposes and features of the present invention will become apparent upon review of the following specification in conjunction with the drawings.

BRIEF DESCRIPTION OF THE DRAWINGS

FIG. 11 is a perspective view of the mirror assembly and garage door opening module and lens or cover or retaining element of FIG. 10, showing the module received at the mirror casing with the lens or cover or retaining element attached at the mirror casing;

FIG. 14 is an enlarged view of the lower region of the mirror casing and garage door opening module and lens or cover and light pipe of the present invention;

FIG. 15 is another perspective view of the lower region shown in FIG. 14;

FIGS. 35-37 are perspective views of the retaining element;

FIG. 41 is another enlarged bottom view of the mirror assembly, showing the retaining element disposed over an indicator of the garage door opening module, with the indicator on;

FIG. 51 is another partial view of the garage door opening module removed from the mirror, shown with the indicator on; and FIGS. 52 and 53 are perspective views of an end portion of the garage door opening module, showing an attachment portion for attaching the garage door opening module to a key ring or the like.

DESCRIPTION OF THE PREFERRED EMBODIMENTS

Figure 1:
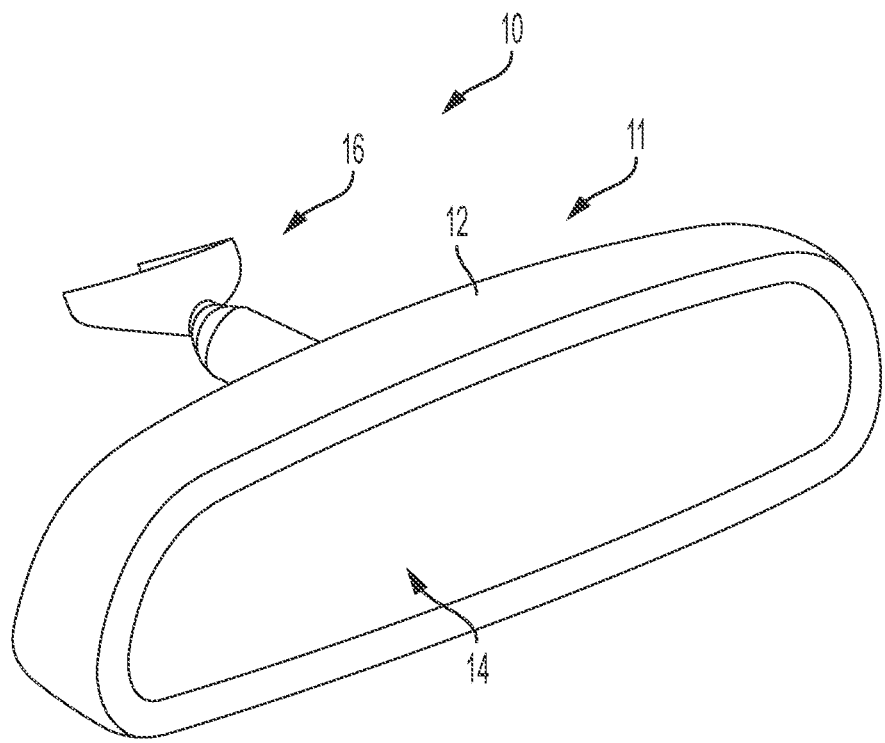
FIG. 1 is a perspective view of an interior rearview mirror assembly in accordance with the present invention.
Figure 2:
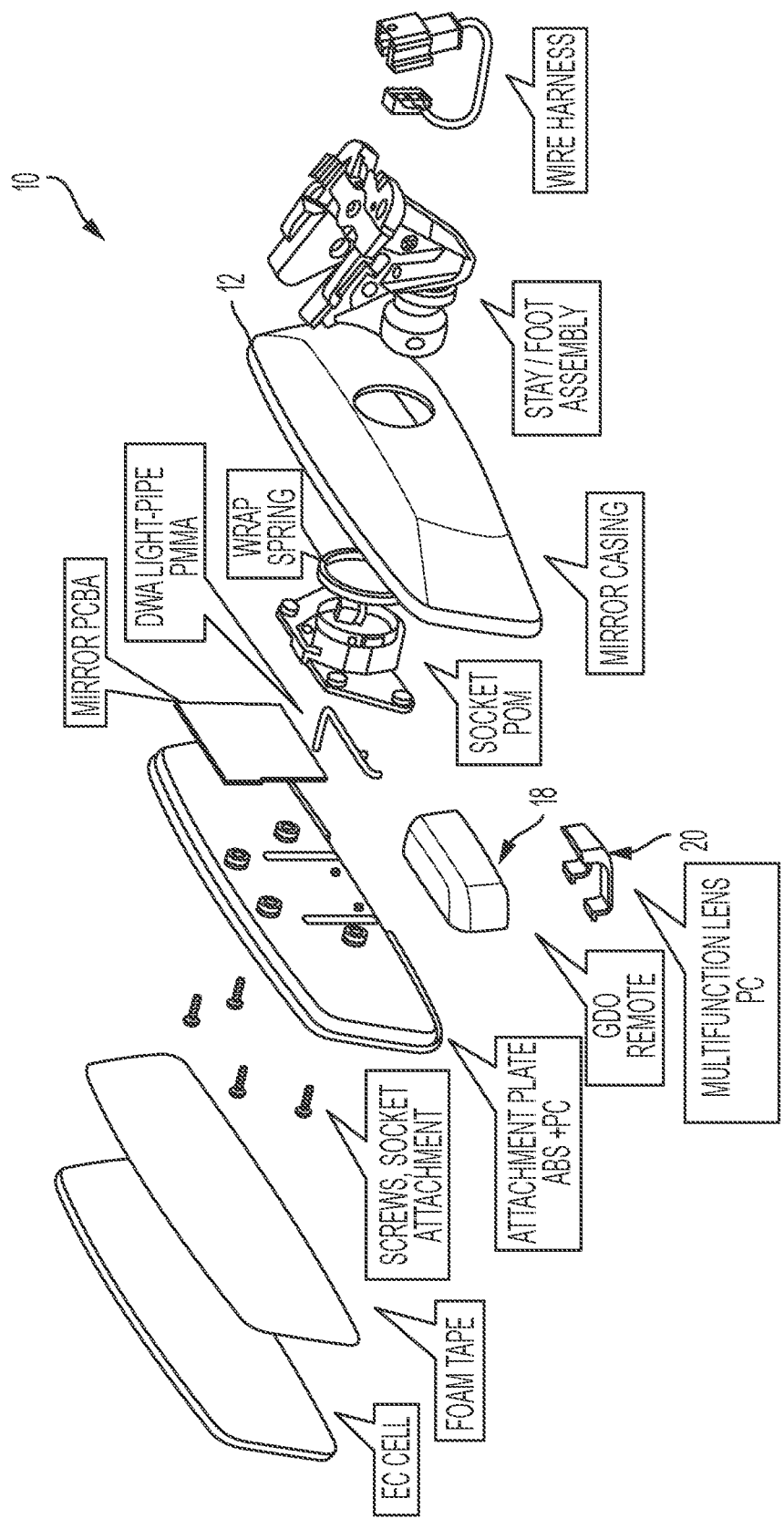
FIG. 2 is an exploded view of an interior rearview mirror assembly of the present invention, showing a garage door opening module with a lens or cover or retaining element for covering a portion of the garage door opening module when the module is received at the mirror casing.
Figure 3:
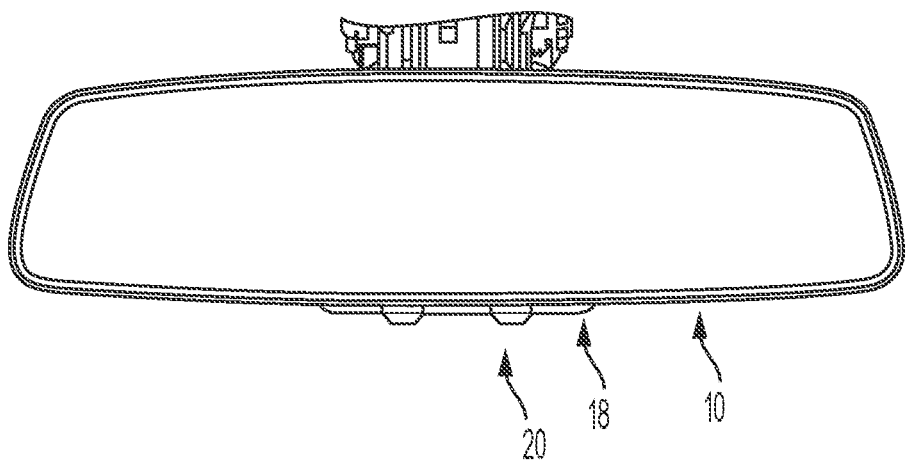
FIGS. 3 and 4 are perspective views of the interior rearview mirror assembly of FIG. 2.
Figure 4:
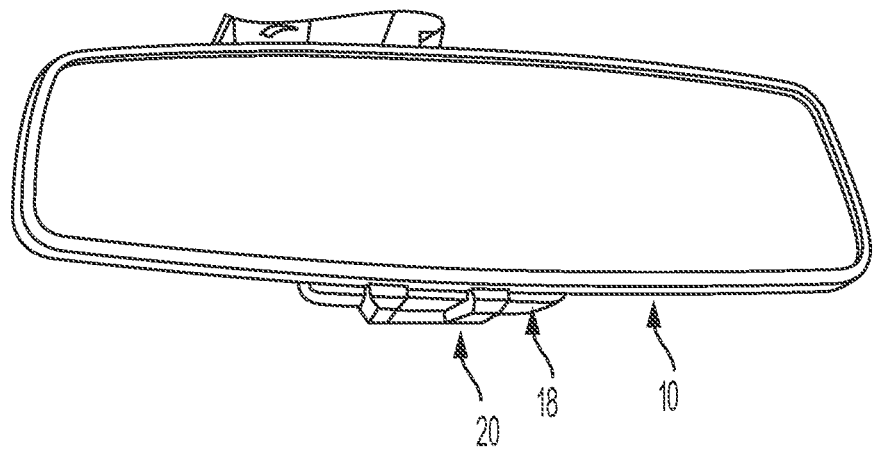
Figure 5:
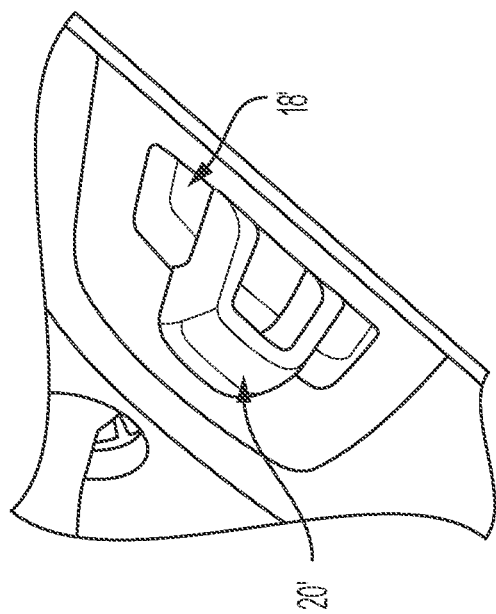
FIG. 5 is a perspective view of the underside of the mirror casing of the mirror assembly of FIGS. 3 and 4, showing the lens or cover or retaining element disposed at the garage door opening module.
Figure 7:
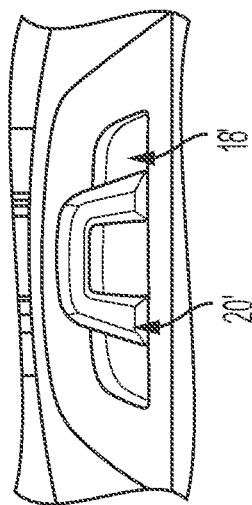
FIGS. 7 and 8 are perspective views similar to FIGS. 5 and 6, showing another lens or cover or retaining element at a garage door opening module when the module is received at the mirror casing.
Figure 6:
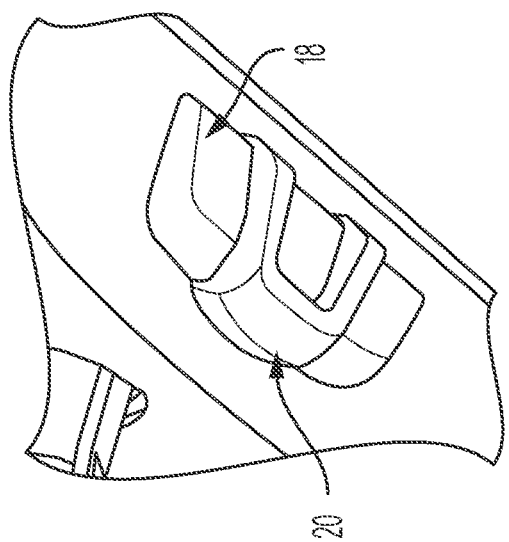
FIG. 6 is another perspective view of the underside of the mirror casing of FIG. 5.
Figure 8:
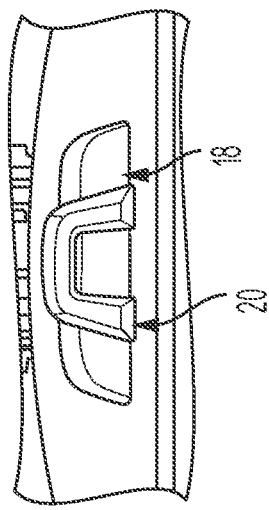
Figure 10:
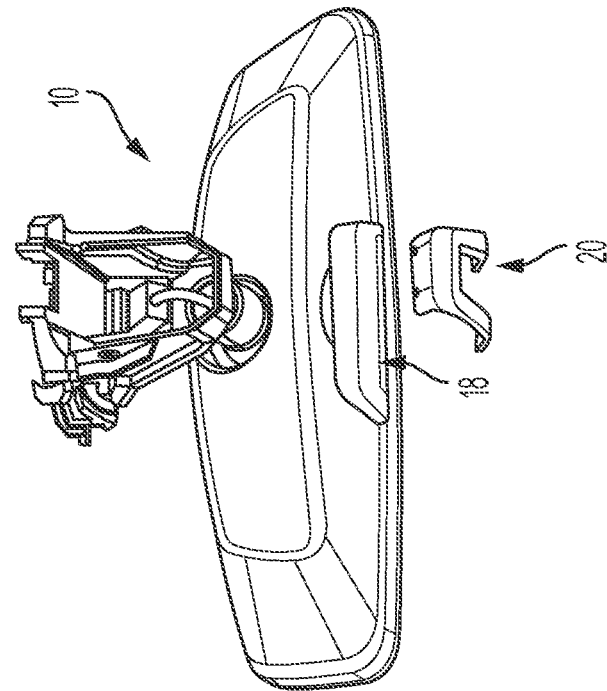
FIG. 10 is another exploded perspective view of the mirror assembly and garage door opening module and lens or cover or retaining element of FIG. 9, showing the module received at the mirror casing.
Figure 9:
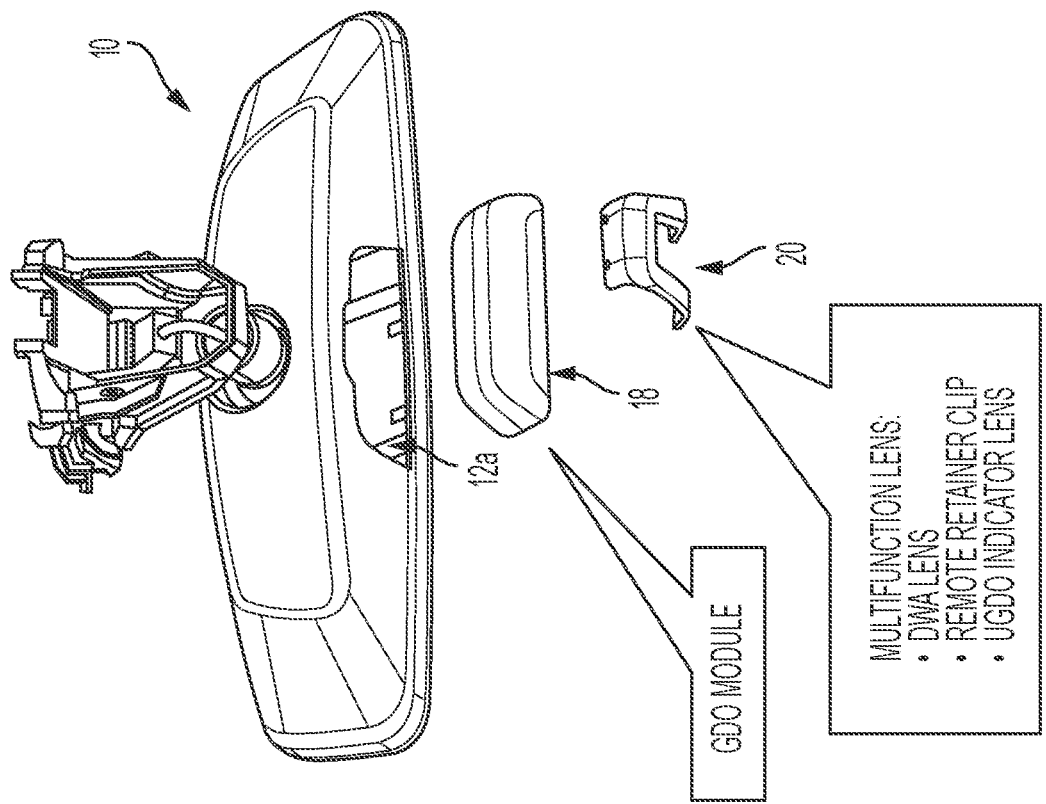
FIG. 9 is an exploded perspective view of the mirror assembly and garage door opening module and lens or cover or retaining element in accordance with the present invention.
Figure 12:
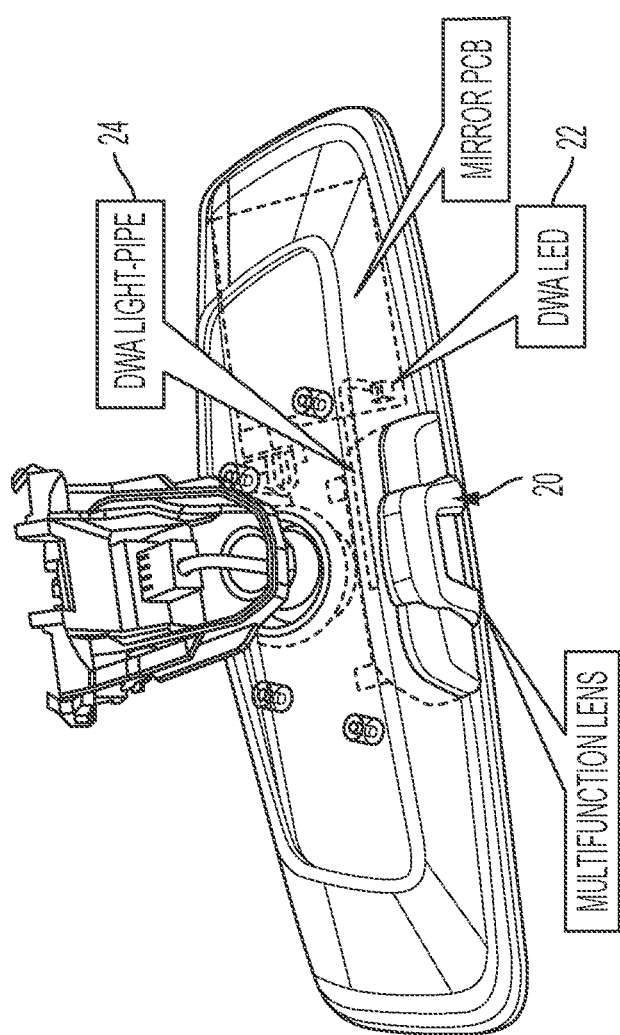
FIG. 12 is another perspective view of the mirror assembly of the present invention, showing a light pipe configured to guide light from a light source in the vehicle to the lens or cover or retaining element.
Figure 13:
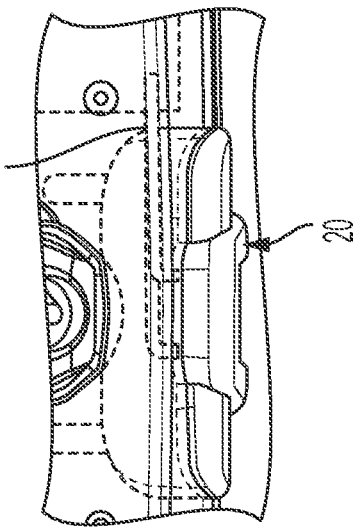
FIG. 13 is another perspective view of the light pipe and garage door opening module and lens or cover or retaining element of FIG. 12.
Figure 16:
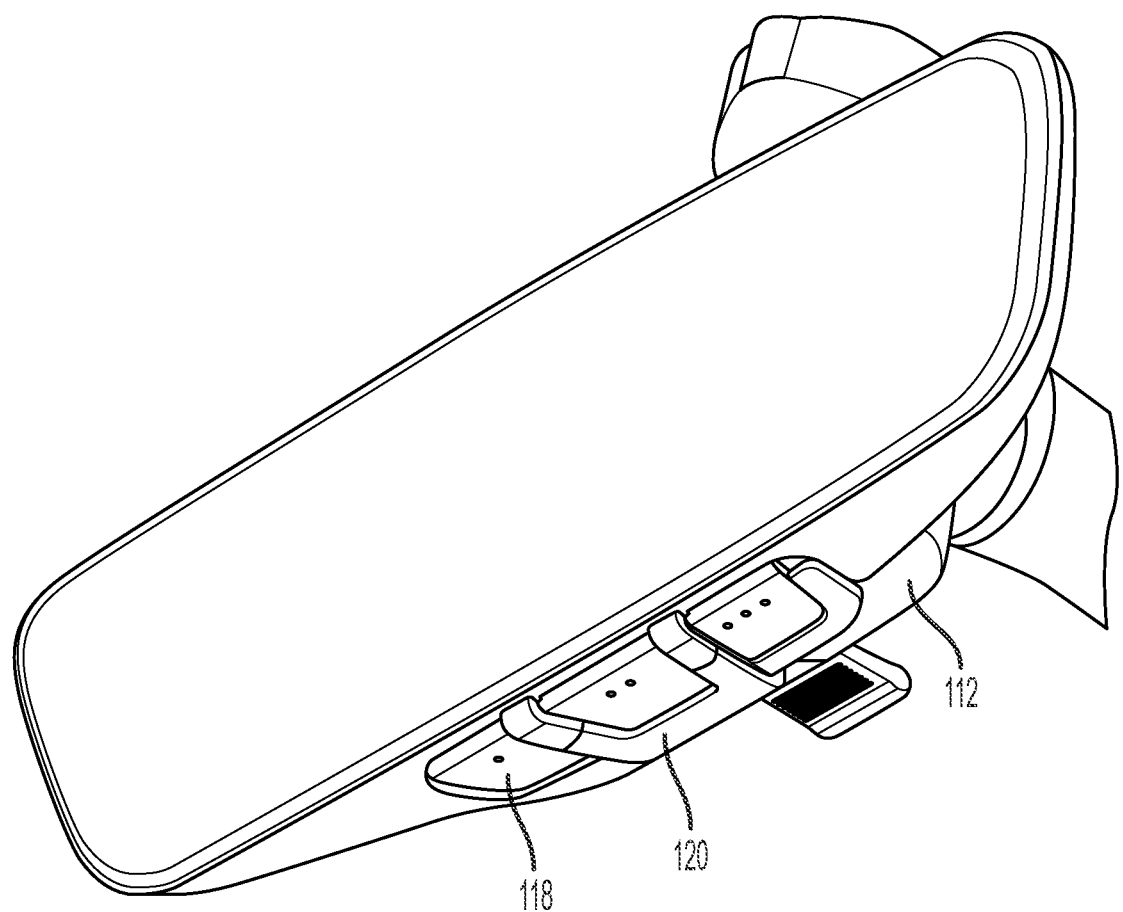
FIG. 16 is a perspective view of another mirror assembly and cover or retaining element of the present invention.
Figure 17:
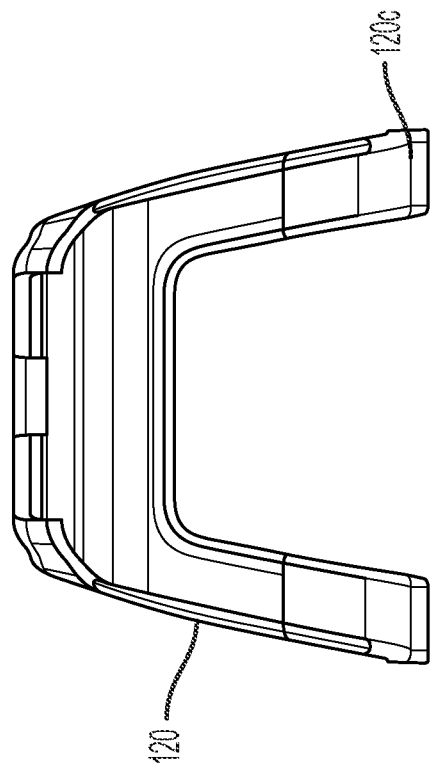
FIG. 17 is a plan view of the retaining element of FIG. 16.
Figure 18:
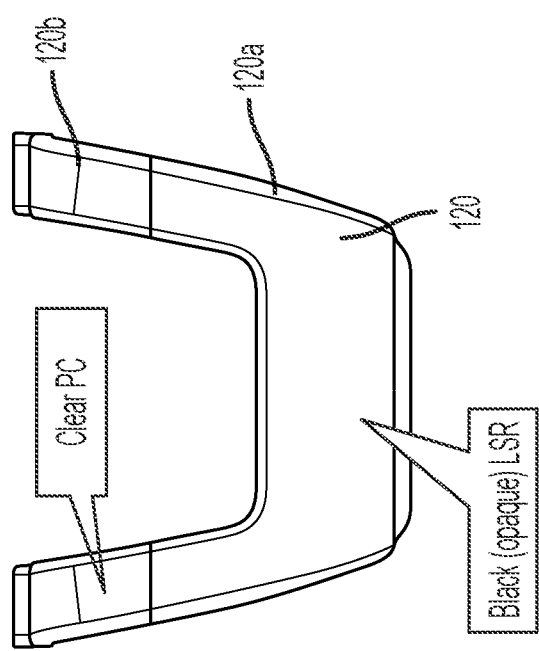
FIG. 18 is another plan view of the retaining element of FIG. 16.
Figure 19:
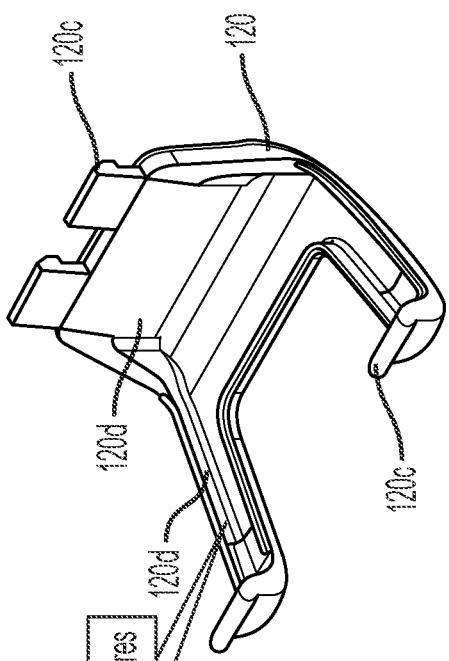
FIG. 19 is a perspective view of the retaining element of FIG. 16.
Figure 20:
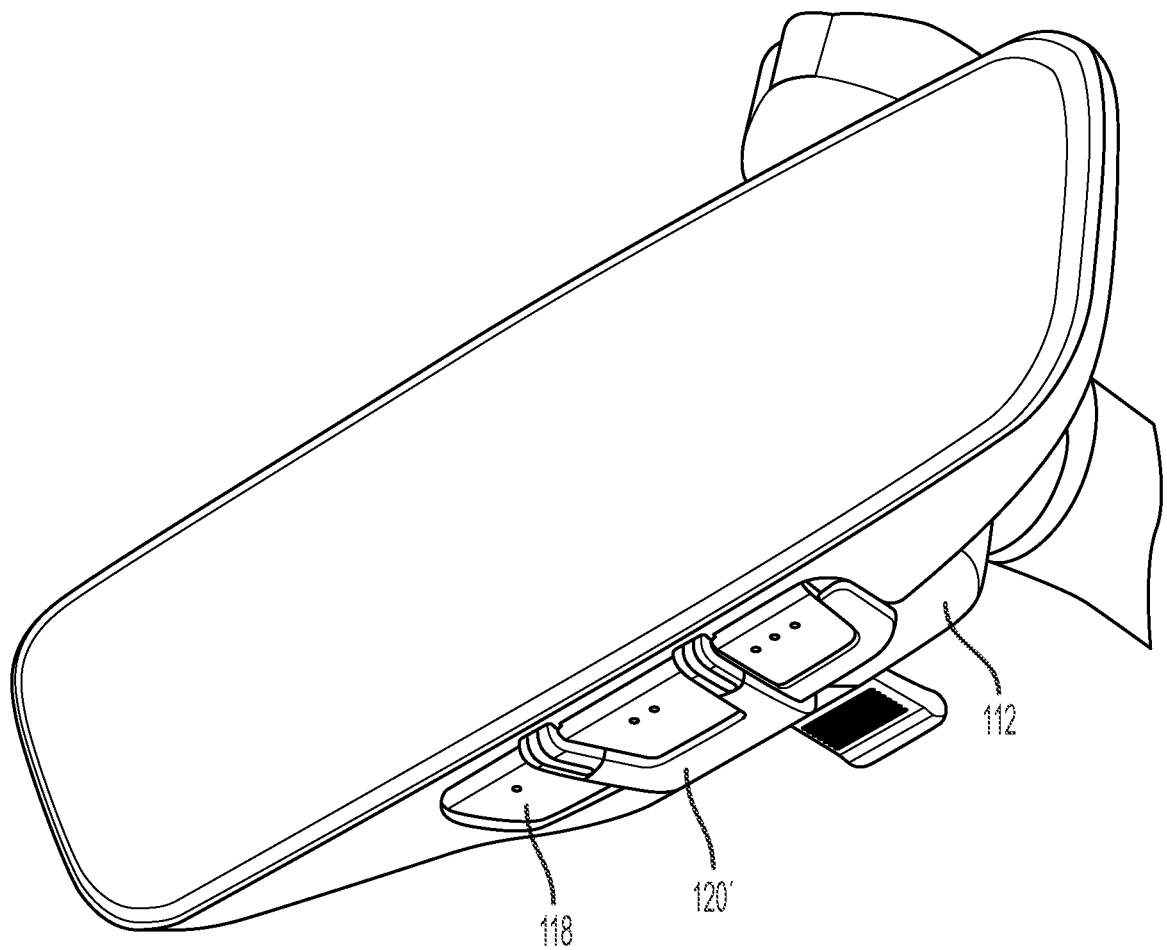
FIG. 20 is a perspective view of another mirror assembly and retaining element of the present invention.
Figure 21:
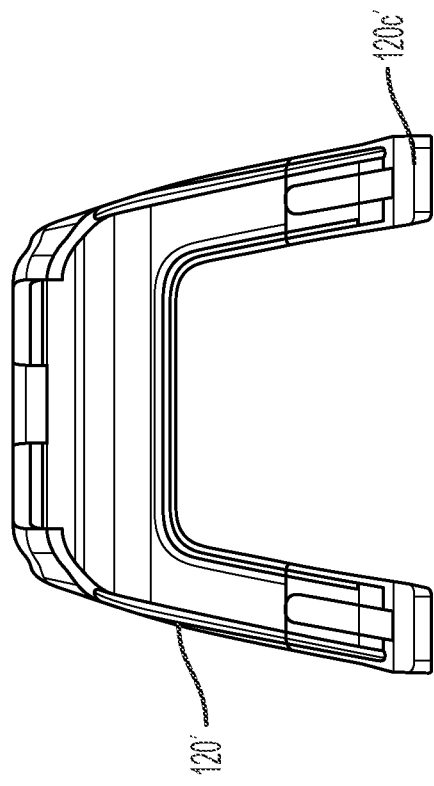
FIG. 21 is a plan view of the retaining element of FIG. 20.
Figure 22:
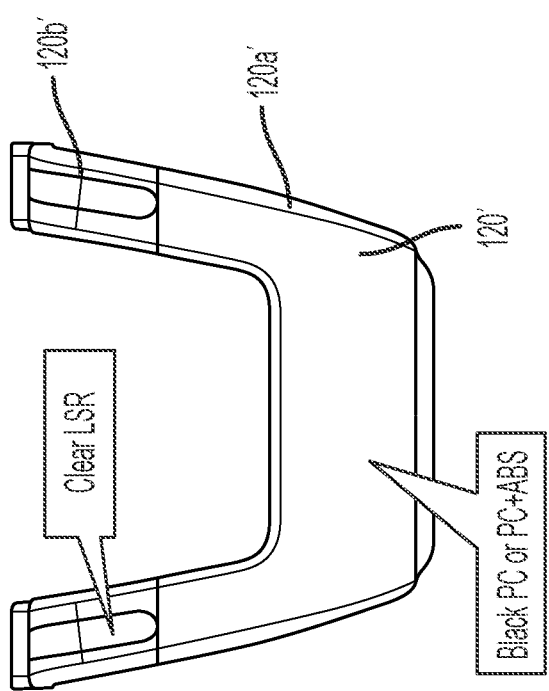
FIG. 22 is another plan view of the retaining element of FIG. 20.
Figure 23:
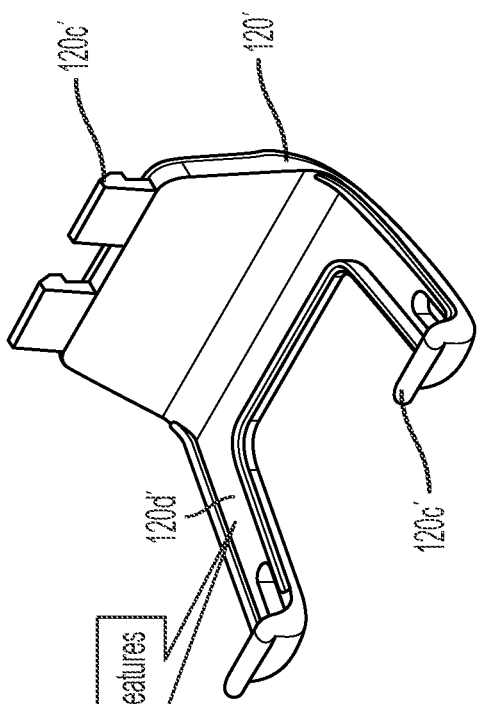
FIG. 23 is a perspective view of the retaining element of FIG. 20.

Referring now to the drawings and the illustrative embodiments depicted therein, an interior rearview mirror assembly 10 for a vehicle includes a mirror head 11 comprising a mirror casing 12 and a reflective element 14 positioned at a front portion of the casing 12 (FIG. 1). In the illustrated embodiment, mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 16. A garage door opening module 18 (FIG. 2) is configured to be received in a receiving portion 12a (such as an aperture or recess or the like and structure established thereat) of the mirror casing 12, such as shown in FIG. 9. The garage door opening module 18 comprises a self-contained module or unit that includes an integrated power source or battery and circuitry, such as control or garage door opener (GDO) circuitry (operating under rolling code) and a transmitter (such as a radio frequency or RF transmitter) for transmitting a signal (such as a RF signal) to a garage door opener at a garage, as discussed below.

The self-contained garage door opening module 18 comprises a casing or housing and one or more user inputs or buttons. The housing is configured to insert into or be at least partially received at the opening or aperture 12a of the mirror casing 12 to attach the garage door opening module 18 at the mirror assembly 10. Thus, the module is configured to cooperate with the receiving portion (such as structure of the module cooperating with structure of the receiving portion) to releasably secure the portable self-contained garage door opening module at least partially at the receiving portion, and the module is configured to cooperate with the receiving portion to release the module from the receiving portion, as discussed below. The portable self-contained garage door opening module comprises at least one user input and a housing that houses (i) garage door opener circuitry operable under rolling code, (ii) a radio frequency transmitter and (iii) a battery for electrically powering the circuitry. The portable self-contained garage door opening module is operable to wirelessly transmit (via the circuitry) a radio frequency signal responsive to actuation of the user input or inputs or buttons of the portable self-contained garage door opening module. Optionally, and desirably, the garage door opening module or modules may be formed or manufactured with a universal housing shape that is configured to fit in recesses or apertures of various mirror casings so as to provide a universal garage door opening module for a variety of mirror applications. The portable self-contained garage door opening module and mirror assembly may utilize aspects of the modules and assemblies described in International Publication No. WO 2016/044706, which is hereby incorporated herein by reference in its entirety.

The housing of the portable self-contained garage door opening module is preferably sealed so as to be substantially water impervious to limit or substantially preclude water intrusion into the housing and circuitry of the sealed module or unit. Thus, the sealed self-contained garage door opening module or unit is suitable to be used as a portable unit and carried by a user in adverse weather conditions, such as rain or snow, high humidity conditions and/or the like. The sealed self-contained garage door opening module or unit thus can be removed from the mirror assembly and carried by the driver or user in adverse weather conditions.

Optionally, the garage door opening module may comprise the garage door opening function and may have an attachment or mounting portion or mechanism, such as at an end of the module opposite the garage door opening buttons or inputs. The user may select a desired optional feature or device or structure or attachment to attach at the end of the module to customize the module for his or her personal preferences. For example, the user may attach an LED device at the end of the module or may attach a toothpick or pocket knife or other attachment (such as other functions or features or structures of the types discussed below). The garage door opening module thus is customizable for the particular user, whereby the user may purchase the base garage door opening module and one or more different attachments that may be selectively attached at the base module by the user. The attachment may snap or click onto the base module and may be readily detached to change to a different attachment as desired. For attachments that require power (such as an LED light or the like), electrical connection to a battery of the base garage door opening module may be made when the attachment is attached at the base module or optionally the attachment (such as an LED light or the like) may include its own power source (such as a lithium battery or the like).

When received in the receiving portion of the mirror assembly, the garage door opening module may be generally flush with the outer or lower surface of the mirror casing at the slot or recess of the receiving portion, or the module may be nested in the mirror casing or may be proud of or may protrude from the mirror casing. Any LED indicators or user-actuated buttons and/or switches or the like preferably protrude down a little from the lower wall of the mirror casing so as to be more readily viewable by the driver and/or to be more readily accessible to/activated by/operable by the driver who is operating the equipped vehicle. The indicators may be disposed at clear or transparent or translucent portions of the cover or retaining element so as to be viewable through the cover or retaining element that is attached at the mirror casing to retain the garage door opening module at the mirror casing, as discussed further below.

Optionally, although shown and described as being received substantially into an aperture or recess at the lower part of the mirror casing, the garage door opening module may be received into a receiving portion of the mirror assembly that is established at a side or upper region of the mirror casing. Optionally, although shown and described as being at the lower part of the mirror casing, the receiving portion of the mirror assembly may comprise a pocket or recess established at a rear portion of the mirror casing (such as at a recess established at the rear of a mirror casing of the types described in U.S. Pat. No. 8,508,831, which is hereby incorporated herein by reference in its entirety), whereby the module may be substantially exposed at the pocket at the rear of the mirror casing. Optionally, the garage door opening module of the present invention may be configured to attach elsewhere, such as at the mounting portion or base of the mirror assembly, or at a windshield electronics module or accessory module at or near or remote from the interior rearview mirror assembly. Optionally, and less desirably, the garage door opening module may be configured to attach elsewhere remote from the interior rearview mirror assembly and windshield, such as at a sun visor or header or console of the vehicle or the like.

The garage door opening module of the present invention is preferably battery powered, such as lithium battery powered, with the battery integrated in the module. The circuitry of the module is operable by or powered by the integrated battery and operable to transmit one or more signals responsive to actuation of one or more of the user inputs or buttons of the garage door opening module. The garage door opening module may be separately obtainable separate from the mirror assembly as a self-contained unit or module. Thus, the mirror manufacturer provides a mirror having a recess or aperture and the mirror manufacturer merely accommodates or packages the garage door opening module in the mirror assembly. Preferably, a lithium ion battery (such as an Energizer CR2032 battery or a Tadiran TL-2450 battery or a Xeno XL-050F battery or the like) is used and the circuitry utilized is designed to minimize power and current utilization or consumption, so that the lithium ion battery need not be replaceable but can power the garage door opening module throughout utilization during the ten years or more life cycle of a vehicle. Operation of the garage door opening module is of course only during a desired garage door opening event and so use of the module is intermittent/sporadic and infrequent (such as, for example, only about two to four times a day or thereabouts), and only then the module operates for a very short period of time (such as a second or so when actuated to open or close the garage door). Thus, the garage door opening module of the present invention can be made compact with a lithium ion battery.

Because the garage door opening module is not powered by the vehicle battery (and is not embedded into or integrated in the vehicle wiring or electrical system), it is desirable to reduce the power consumption by the module. Thus, the garage door opening module may include features that assist in reducing the power consumption.

Optionally, the garage door opening module may be backlit or illuminated by a light source or LED that is separate and distinct from the garage door opening module and is not powered by the detachable self-contained battery operated garage door opening module. For example, the LED may be part of the interior rearview mirror assembly and may be disposed at the mirror assembly so that, when activated to emit light, the LED emits light that illuminates at least a portion of the garage door opening module when the garage door opening module is received at the receiving portion of the mirror assembly. In such a configuration, the interior rearview mirror assembly (at which the detachable self-contained battery operated garage door opening module is received) may incorporate and contain such a separate backlighting LED, with the separate LED being powered by the vehicle electrical system itself (and not by the battery of the detachable self-contained battery operated garage door opening module).

Optionally, it may be desirable that the garage door opening module include backlighting of the user inputs or buttons (and/or the user inputs or buttons may comprise blister switches or buttons or the like that provide a tactile feel including a raised or depressed button and a click feature when activated). The backlighting may be provided by an LED or the like. However, in order to reduce the power consumption, the module may utilize a glow in the dark material at least at its button regions. Thus, at night, the buttons would glow or would be illuminated to enhance visibility of the buttons. Such a non-electrical glow function does not require any battery power. Thus, the garage door opening module of the present invention provides for button or icon illumination without vehicle wiring. Such wireless illumination may be suitable for use in door handles or other access systems.

Optionally, the garage door opening module may be trainable or universal garage door opening device such as utilizing known circuitry and protocols, or the garage door opening module may operate in accordance with or may be associated with a MyQ® garage door opening system or protocol commercially available from The Chamberlain Group, Inc. of Elmhurst, Ill. For example, the garage door opening module may operate in a system utilizing aspects of the systems described in U.S. Pat. Nos. 6,998,977 and/or 8,421,591, which are hereby incorporated herein by reference in their entireties. Optionally, the garage door opening module may utilize aspects of the vehicle based garage door opening systems described in U.S. Pat. Nos. 8,779,910; 8,577,549; 6,396,408; 6,362,771; 7,023,322 and/or 5,798,688, which are hereby incorporated herein by reference in their entireties.

When the garage door opening module of the present invention is used with a MyQ® or similar system, an internet gateway is utilized wherein the garage door opening module is in communication with the likes of a smart phone carried into the vehicle by an occupant (such as the driver or a passenger). The garage door opening module wirelessly communicates with such a smart phone or the like and the driver of the equipped vehicle may submit input (such as voice input or touch input or other user input) via the smart phone to the garage door opening module. The garage door opening module then wirelessly communicates or links with a MyQ® home module or unit located remotely from the vehicle, such as at the house or home of the driver where the subject garage door opener (that is to be remotely operated via the garage door opening module of the present invention) is located. Commands and/or information are thus wirelessly communicated (preferably via the internet) to the remote-located MyQ® house/home module. Correspondingly, data as to the status (opened or closed) of the likes of the subject garage door at the subject house/home may be communicated from the house/home to the equipped vehicle via the internet. Such a smart phone (or equivalent device) internet-gateway garage door opening system may be incorporated by the likes of Ford Motor Company into its SYNC® communication system. Alternatively, or in addition to smart phone utilization in the garage door opening system of the present invention, the likes of General Motors' ONSTAR® may incorporate the likes of a MyQ® garage door opener communication into the vehicle, with a garage door opening module (associated with the MyQ® system) preferably included in (and removable/detachable from) the interior rearview mirror assembly as described herein.

A distinct advantage of the ease with which the garage door opening module may be inserted into and removed from the mirror casing is that the vehicle owner or user can move the garage door opening module (and thus access to and control of his or her house/home garage door opener) from one vehicle to another vehicle. This portability enhances the utility and security of such a module. For example, and with the garage door opening module removed from the mirror assembly and vehicle, another driver of the vehicle (such as another family member, co-worker or the like) cannot remotely access the vehicle owner's (or prior user's) garage door opener or security barrier or home devices and/or the like when that person borrows or uses another person's vehicle. Also, when a person rents a vehicle or obtains a loaner vehicle when leaving his or her vehicle for service, that person can remove the garage door opening module from his/her own car—temporarily use it in the rental/loaner vehicle—and when his/her own vehicle becomes available again, reinsert the garage door opening module into his/her own vehicle.

A further distinct advantage of the ease with which the garage door opening module of the present invention may be inserted into and removed from the mirror casing (or from another portion of an interior rearview mirror assembly such as a foot or attachment portion thereof at or approximate where the interior rearview mirror assembly attaches to the windshield of the equipped vehicle via the likes of a mirror mounting button, such as known in the mirror mounting art) is that the garage door opening module (being portable and removable and not integrated into the interior mirror assembly) may be removed from the interior rearview mirror assembly when, for example, the vehicle is sold or when the vehicle is being valet parked or loaned or rented out or sent in for service at a service station/repair shop or the like.

The portability of the present invention has distinct advantages over prior known systems such as a trainable garage door opening system available from Gentex Corporation of Zeeland, Mich. under the trade name HOME-LINK®. In the HOMELINK® trainable garage door opening system, the transmitter (and any associated buttons, receiver, antennae, circuitry and/or the like) is integrated into the vehicle and is powered by a power source of the vehicle (typically the vehicle's ignition/battery). For example, a HOMELINK® trainable garage door opening system is provided by Gentex integrated into an interior rearview mirror assembly that Gentex ships to a vehicle manufacturer/original equipment manufacturer (OEM) for installation by that OEM into a vehicle. As sold to and used by a buyer/consumer of a HOMELINK®-equipped vehicle, the trainable garage door opener is integrated into the vehicle and is not a user-removable, self-contained, portable, battery-operated garage door opening module of the present invention.

In accordance with the present invention, the garage door opening module is self-contained—all mechanical and electrical parts needed for operation are contained/packaged in a single unit. Thus, the battery, any user-operable buttons, the circuitry, antennae, casing and the like are provided in a unitary module or package. Thus, the owner of a vehicle equipped with the self-contained, battery-operated, portable, non-integrated garage door opening module of the present invention can, for example, remove the self-contained, battery-operated, portable, non-integrated garage door opening module from a mirror casing of the interior mirror assembly where it is housed when leaving the vehicle and may use the garage door opening module outside the vehicle or mount it into another vehicle (or replace the current garage door opening module with another updated garage door opening module). This portability is not possible with the known HOMELINK® system, where the garage door opening device is an integral part of likes of an interior mirror assembly or a visor and is not removable therefrom as a self-contained, portable unit. Thus, for example, if an owner of a vehicle equipped with a HOMELINK® system sells or scraps that vehicle, the HOMELINK® garage door opening device (being integrated into the vehicle) is sold with and goes with the vehicle.

The portability of the garage door opening module of the present invention has further advantages. An OEM manufacturer of automobiles can sell its vehicles equipped with an interior rearview mirror assembly that is configured to receive a self-contained, battery-operated, portable garage door opening module, but not actually include in that interior rearview mirror assembly the garage door opening module itself. Then the buyer of that vehicle can buy the garage door opening module from a store (such as a Menards store or a Target store or a Home Depot or a Lowes or the like) or buy the garage door opening module online from the likes of Amazon, and the owner of the vehicle can himself/herself install the garage door opening module into the interior rearview mirror assembly of the vehicle that is configured to receive that self-contained, battery-operated, portable garage door opening module. By not being integrated into the vehicle, the consumer can choose the best price and place to buy the garage door opening module, a distinct advantage over the integrated HOMELINK® systems currently used in vehicles where the HOMELINK® unit is not portable and where the consumer needs to buy the HOMELINK® feature when buying the subject vehicle, and thus must pay the price demanded by the OEM dealership (such as a Ford dealership or a GM dealership or a Toyota dealership) to buy the subject vehicle equipped with the HOMELINK® option.

A self-contained, battery-operated, portable garage door opening module suitable for use in the present invention is the Chamberlain 953EV Garage Door Opener Remote available from The Chamberlain Group Inc. of Elmhurst, Ill. The Chamberlain 953EV Garage Door Opener is for use with 315 MHz or 390 MHz garage door openers manufactured after Jan. 1, 1993. The battery-operated Chamberlain 953EV garage door opener activates when the programmed button in the remote control is pressed. The remote control can activate up to three garage door openers. Other self-contained, battery-operated, portable garage door opening modules are available from Chamberlain, such as Universal Clicker® Products. Chamberlain universal clicker garage door opener products are designed to work with a variety of garage door opener brands to give convenient, secure access to a garage or a home. They work with a variety of garage door opener models and frequencies. For example, the Clicker® Universal Remote Control Model KLIK1U (that can operate up to two different brands and/or frequencies of garage door openers) is a self-contained, battery-operated, portable garage door opening module suitable to use in the present invention.

Optionally, and with reference to FIGS. 2-15, a lens or bezel or cover or retaining element 20 is provided that attaches at the mirror casing 12 to retain or secure the garage door opening module 18 thereat when the module is at least partially received at the receiving portion of the mirror casing. The lens or cover or retaining element may provide a multifunction lens that functions as a clip or retainer for retaining or securing the garage door opening module at the receiving portion of the mirror casing (such as by snap-attaching at the mirror casing at the module), and that may also function as an illumination source or alert, as discussed below.

As best seen in FIGS. 5-8, the lens or cover or retaining element 20, 20' may be formed to conform with or correspond with the lower surface of the garage door opening module, such that, when the lens or cover is attached at the mirror casing, the lens or cover engages and retains or secures the module securely or firmly at the receiving portion. The lens or cover 20' (FIGS. 7 and 8) is configured to engage and retain or secure a different shaped lower portion of a garage door opening module 18' than lens or cover 20, but is otherwise generally similar to the lens or cover 20, such that a detailed discussion of lens or cover 20' need not be repeated herein.

Optionally, the multifunction lens or cover 20 may comprise an alert or illumination element that may be illuminated via a light source 22 within the mirror assembly (such as a light emitting diode at a circuit board in the mirror casing). For example, and such as can be seen with reference to FIGS. 2 and 12-14, a light pipe 24 may be used to guide or direct light emitted by a light emitting diode 22 (LED) to the lens 20, whereby, when the LED is activated or energized, the lens 20 is illuminated. The LED may be activated responsive to any signal or input. Optionally, for example, the LED 22 may be associated with anti-theft system of the vehicle, whereby the anti-theft warning light or LED 22 may be actuated when an anti-theft system of the vehicle is actuated (such as when the doors are locked), and the lens 20 thus may glow or emit light (such as responsive to a short pulse of light emitted by the LED 22) to indicate to a person viewing the vehicle from outside that the anti-theft system is activated. The lens may be designed to spread or emit light 360 degrees to signal to people outside of the vehicle and around the vehicle that the anti-theft system is activated.

Optionally, the LED 22 (or another LED or light source within the mirror casing) may be activated to provide illumination at the lens or cover 20 for other functions or features. For example, the LED may be actuated to provide illumination at and around the lens or cover 20 to enhance visibility and viewability of the garage door opening module and its button or buttons in low lighting conditions. The LED may be responsive to a user input or ambient light sensor so that the LED may be activated when lighting conditions are low or below a threshold level, or when the user selectively actuates the LED to enhance viewability of the garage door opening module.

The lens may be designed to direct light towards the buttons of the garage door opening module, or the lens may be configured to diffusely glow to illuminate the region where the garage door opening module is disposed, or optionally the lens may be configured to emit or project low level illumination downward towards the dashboard or center console of the vehicle. Optionally, the lens may be configured to project light or illuminate a graphic or icon etched or otherwise established at the lens (such as at a surface of the lens) to backlight or highlight the graphic or icon. The LED may comprise any suitable light emitting diode or light source, such as a white light-emitting light emitting diode or other colored LED, such as for customizing the appearance by an OEM, whereby such customized light may match or contrast or harmonize with the other lighting within the vehicle.

Optionally, and such as shown in FIGS. 14 and 15, the portable self-contained battery operated garage door opening module 18 may include an operation indicator 18c (such as a green indicator or LED or the like) that is energized when the garage door opening module is actuated (such as by a user pushing upward at the lens or at a button of the module when the module is received at the receiving portion of the mirror casing). The lens 20 may be configured to be disposed over the indicator 18c when the lens is attached at the mirror casing to retain or secure the module at the mirror casing, whereby light emitted by the indicator 18c passes through the lens (which may comprise a generally transparent or translucent or tinted or colored or diffuse plastic or polycarbonate element) so as to be viewable and discernible by the user of the garage door opening module. Optionally, the self-contained battery operated garage door opening module 18' may include a battery indicator 18*d* (such as a red indicator or LED or the like) that is energized when the battery level or charge of the battery of the garage door opening module is low or below a threshold level. The lens 20 may be configured to be disposed over the indicator 18*d* when the lens is attached at the mirror casing to retain or secure the module at the mirror casing, whereby light emitted by the indicator 18*d* passes through the transparent or translucent or tinted or colored or diffuse lens so as to be viewable and discernible by a person viewing the mirror assembly and garage door opening module.

Thus, the cover or retaining element may comprise a plastic or polymeric element that is configured to snap attach to the mirror casing at the receiving portion of the mirror casing. The cover element may comprise a dark or opaque or non-light-transmitting portion and a substantially clear or transparent or translucent or visible light-transmitting portion, which is disposed at or over a light source of the portable self-contained battery operated garage door opening module or over a light source of the mirror assembly or mirror head. For example, and with reference to FIGS. 16-19, a portable self-contained battery operated garage door opening module 118 may be received at a receiving portion of a mirror casing 112, and a retainer clip or cover element 120 is configured to snap attach at the mirror casing to retain the portable self-contained battery operated garage door opening module in the mirror casing. The cover element 120 a dark or opaque or non-light-transmitting portion 120*a* and a substantially clear or transparent or translucent or visible light-transmitting portion 120*b* (such as at the end regions of the generally U-shaped cover element), which are disposed at or over one or more light sources of the portable self-contained battery operated garage door opening module or over one or more light sources of the mirror assembly or mirror head. The substantially clear or transparent or translucent or visible-light-transmitting portion or portions 120*b* are then backlit by respective light sources of the portable self-contained battery operated garage door opening module or of the mirror assembly or mirror head.

In the illustrated embodiment, the cover element 120 includes tabs 120*c* for engaging corresponding tabs or elements of the mirror casing to snap attach the cover element at and to the mirror casing. The cover element also includes a compressible feature 120*d* at its inner surface that opposes and engages the portable self-contained battery operated garage door opening module 118 when the portable self-contained battery operated garage door opening module is in the receiving portion of the mirror casing and the cover element is snap-attached at the mirror casing to retain the portable self-contained battery operated garage door opening module therein. The compressible feature may comprise a rubber material or other suitable resilient or compressible or elastic material (which may be attached to the more rigid outer portion of the plastic cover element or which may be overmolded, such as in a two-shot molding process, over the inner surface of the plastic cover element) that compresses against the portable self-contained battery operated garage door opening module when the cover element is snap-attached to the mirror casing to retain the portable self-contained battery operated garage door opening module in the receiving portion of the mirror casing. The cover element thus functions to tightly hold the portable self-contained battery operated garage door opening module in place and reduces or substantially precludes rattling of the portable self-contained battery operated garage door opening module relative to the mirror casing or cover element. The cover element 120 may otherwise be similar to the cover elements discussed above such that a detailed discussion of the cover elements need not be repeated herein. Optionally, the substantially non-light-transmitting portion may be injection molded of one material (such as an opaque liquid silicone rubber (LSR) or the like) and the clear or light-transmitting portion may be molded of a second material (such as a clear polycarbonate) via a second molding step and the compressible material may be overmolded via a third molding step to form the cover element.

As shown in FIGS. 16-19, the cover element may have its end regions formed of a clear or light-transmitting material (such as a clear polycarbonate material or the like), with the compressible feature or portion disposed substantially over the entirety of the inner surface of the cover element. Optionally, and such as shown in FIGS. 20-23, a cover or retaining element 120' may have clear strips or strips or narrow regions 120*b*' established at the opaque or non-light-transmitting portion 120*a*' (such as a black polycarbonate material or polycarbonate and ABS material or the like), with the strips 120*b*' configured to be disposed at and over the light sources when the cover element 120' is snap-attached at the mirror casing to retain the portable self-contained battery operated garage door opening module at the mirror casing. The cover element 120' may include tabs 120*c*' and a compressible feature 120*d*' established over only a portion of its inner surface to engage and compress against the portable self-contained battery operated garage door opening module when the cover element 120' is snap-attached at the mirror casing to retain the portable self-contained battery operated garage door opening module at the mirror casing. The cover element 120' may otherwise be similar to the cover or retaining elements discussed above such that a detailed discussion of the cover or retaining elements need not be repeated herein.

Figure 24:
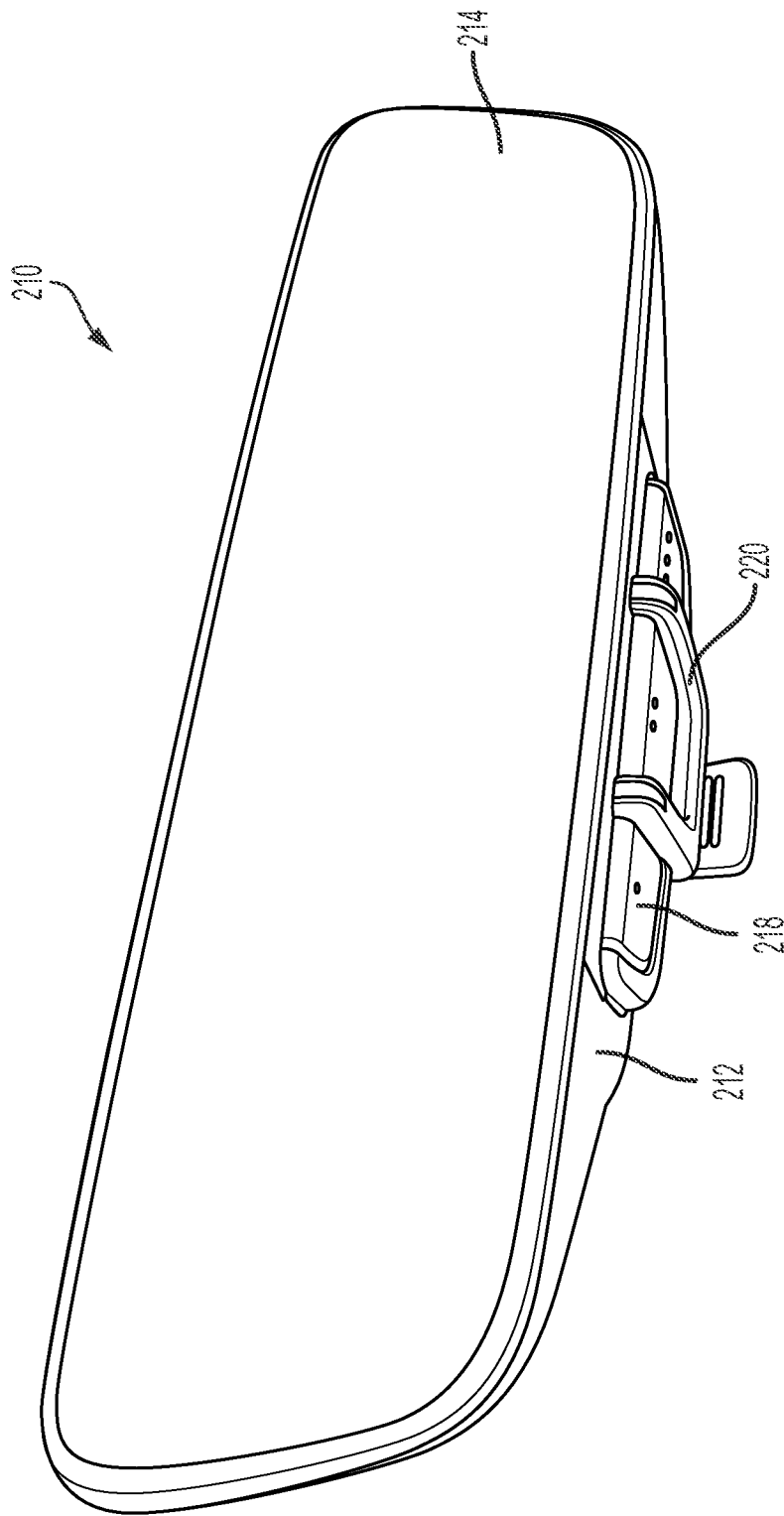
FIG. 24 is a perspective view of a prismatic mirror assembly and retaining element and garage door opening module of the present invention.
Figure 25:
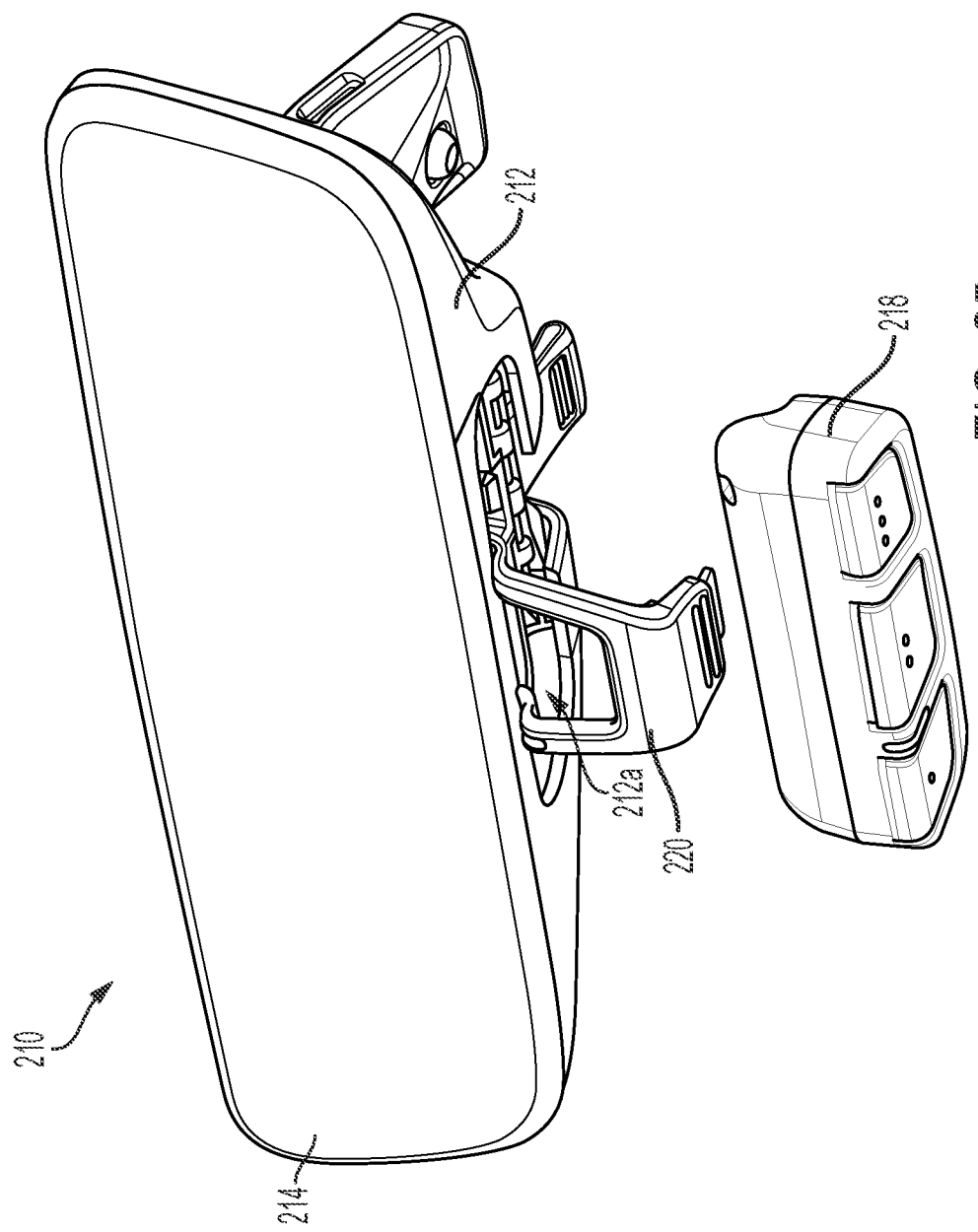
FIG. 25 is a perspective view of the prismatic mirror assembly, shown with the retaining element open and the garage door opening module removed.
Figure 26:
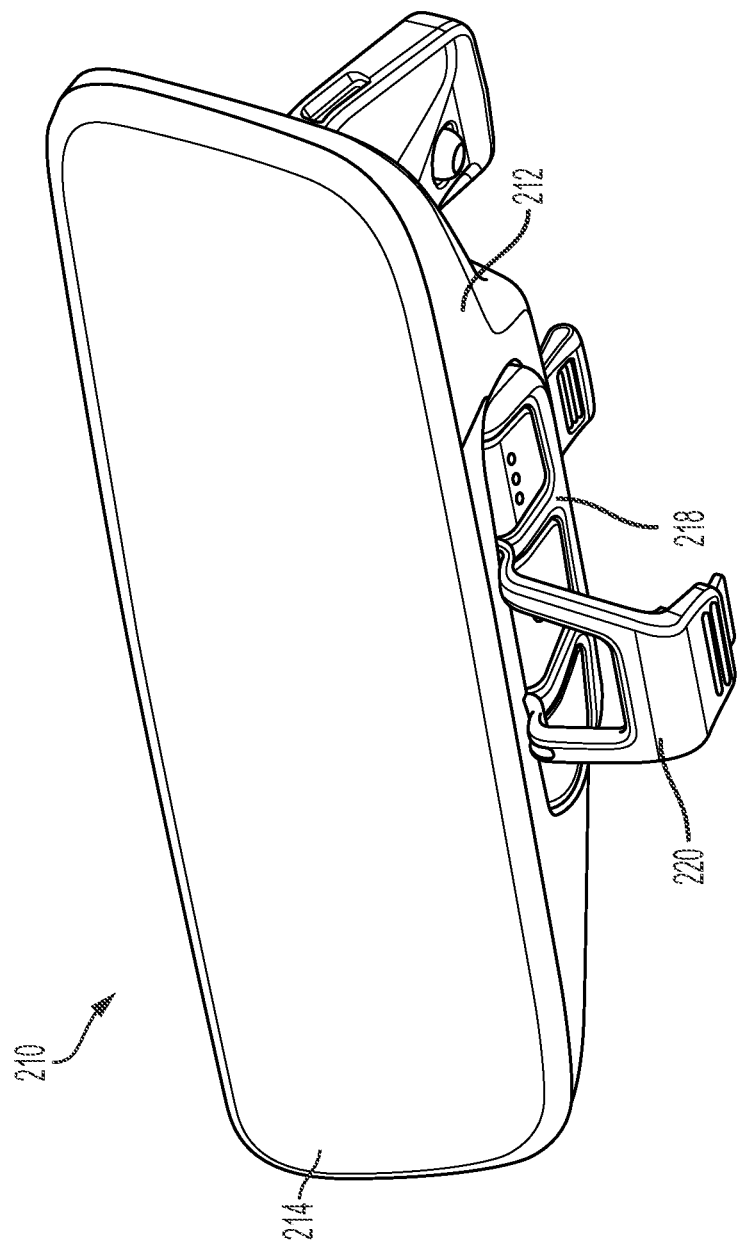
FIG. 26 is a perspective view of the prismatic mirror assembly, shown with the retaining element open and the garage door opening module received in the mirror.
Figure 27:
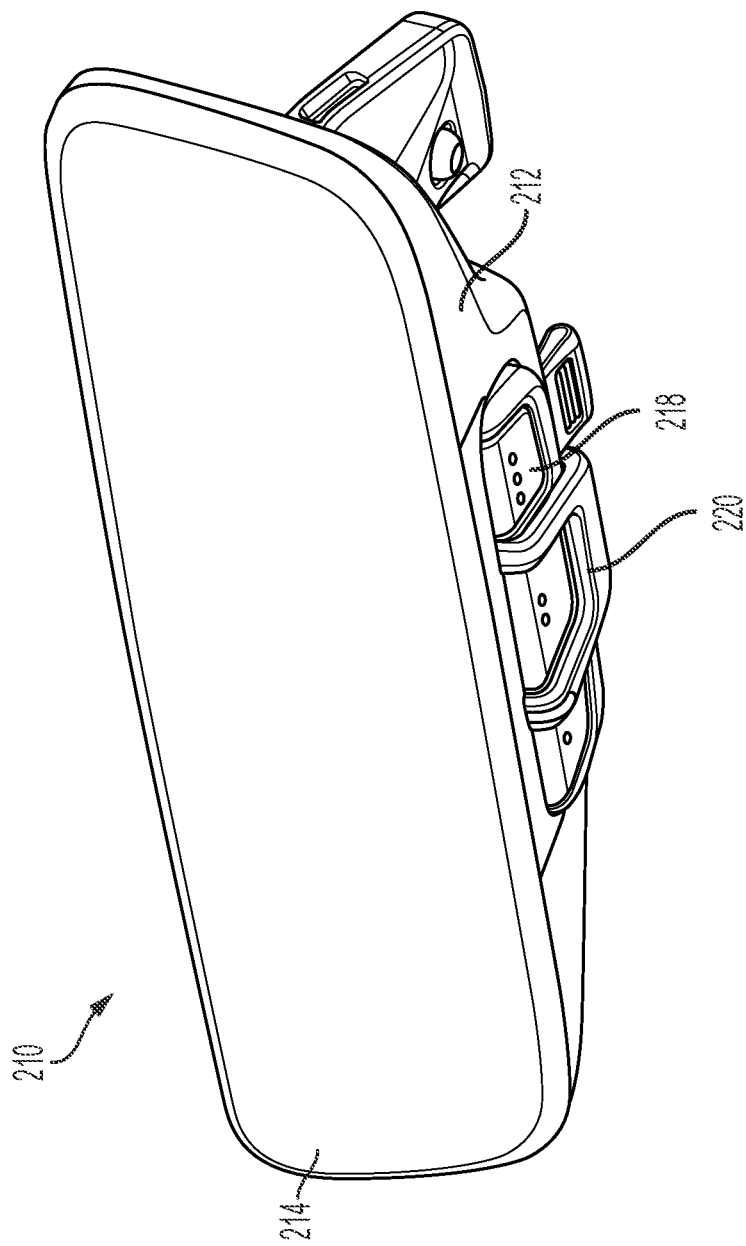
FIG. 27 is a perspective view of the prismatic mirror assembly, shown with the retaining element closed with the garage door opening module received in the mirror.

With reference to FIGS. 24-27, a self-contained garage door opening module 218 may be received in a receiving portion or recess or pocket 212*a* of a mirror casing 212 of a mirror assembly 210, with a lens or bezel or cover or retaining element 220 that attaches at the mirror casing 212 to retain or secure the garage door opening module 218 thereat when the module is received at the receiving portion of the mirror casing. As shown in FIGS. 25 and 26, the retaining element 220 is pivotally mounted at the mirror casing 212 and pivots between an open position or state (FIGS. 25 and 26) and a closed position or state (FIGS. 24 and 27). When in the open state, the retaining element is at least partially detached from the mirror casing and the garage door opening module 218 is removable from the receiving portion 212*a* or insertable into the receiving portion 212*a*. When the module is inserted into the receiving portion (such as shown in FIG. 26), the retaining element 220 can be closed (FIG. 27) to fully attach at the mirror casing so as to retain the module in the receiving portion.

Figure 28:
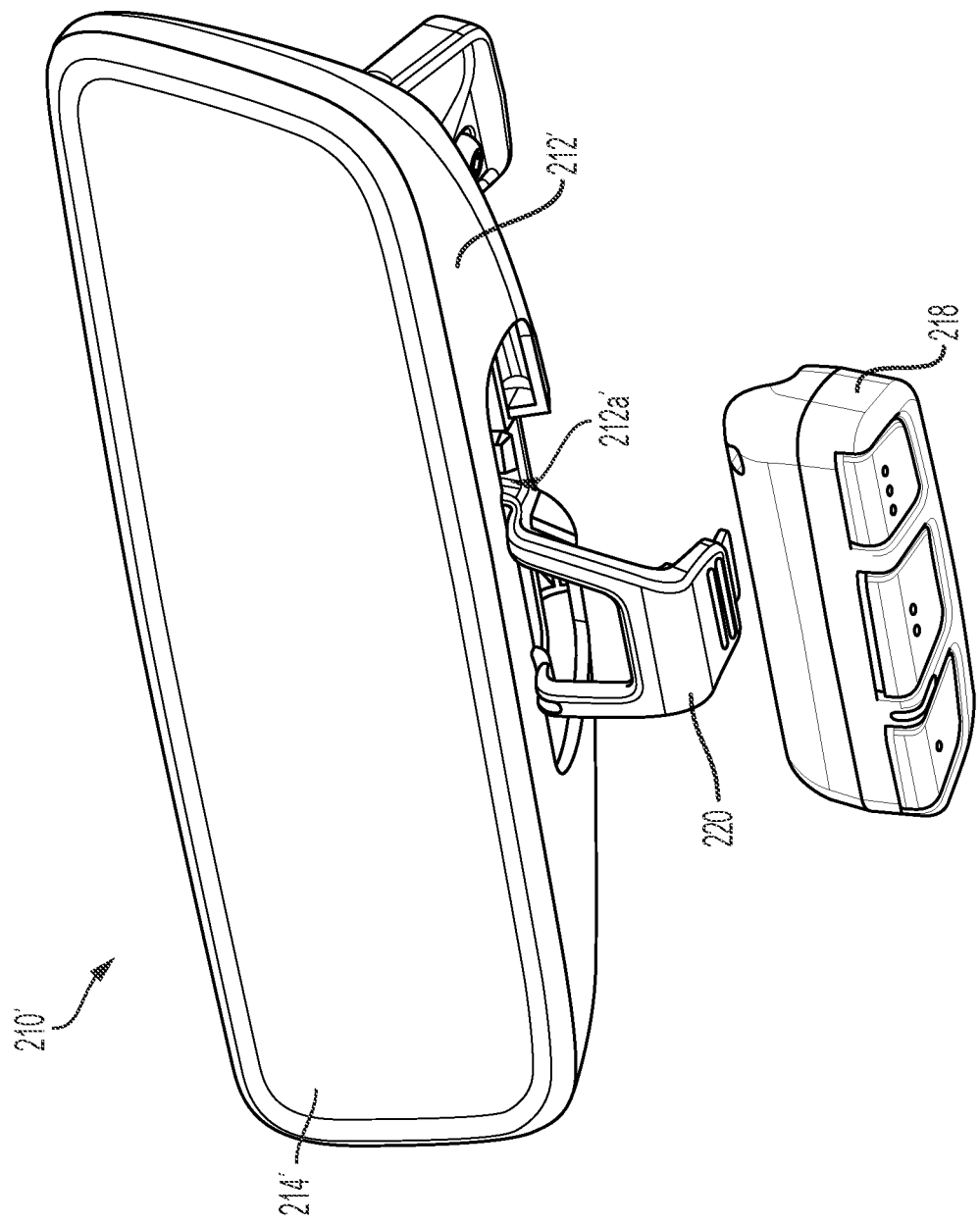
FIG. 28 is a perspective view of an electrochromic mirror assembly, shown with the retaining element open and the garage door opening module removed.
Figure 29:
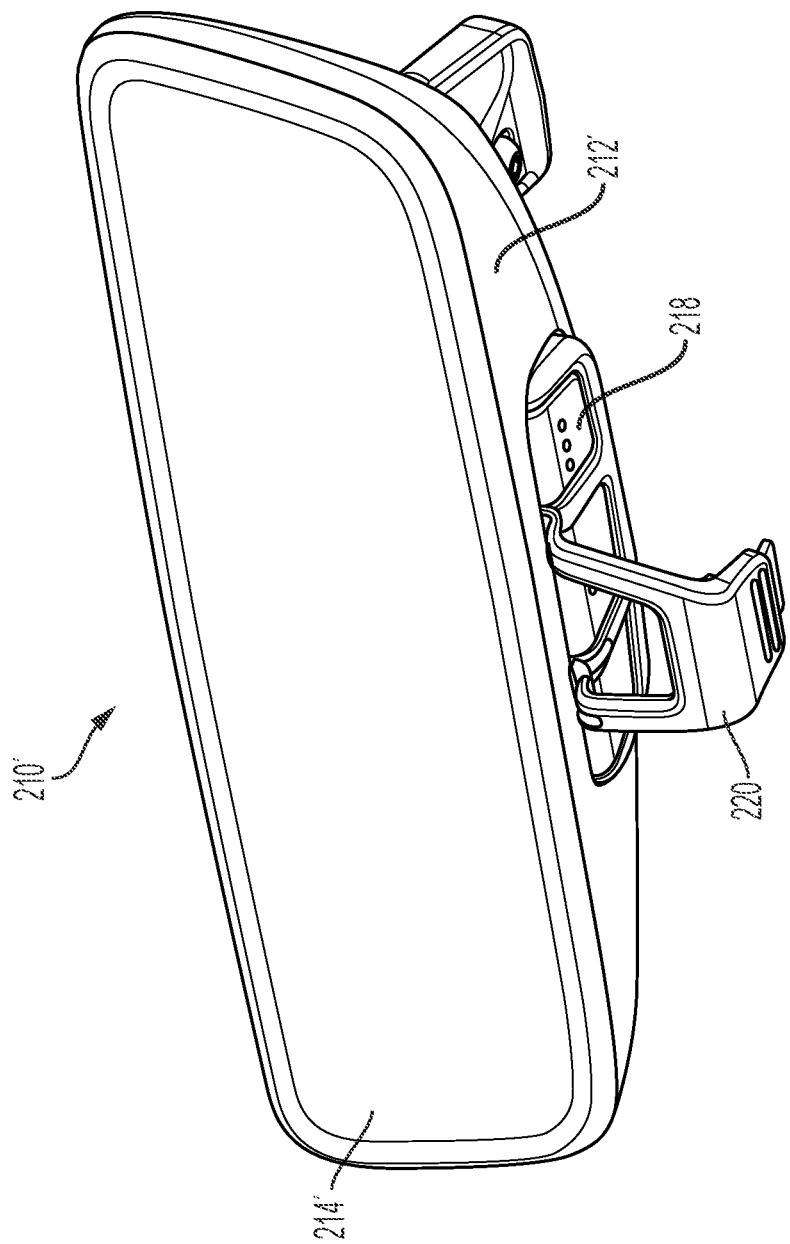
FIG. 29 is a perspective view of the electrochromic mirror assembly, shown with the retaining element open and the garage door opening module received in the mirror.
Figure 30:
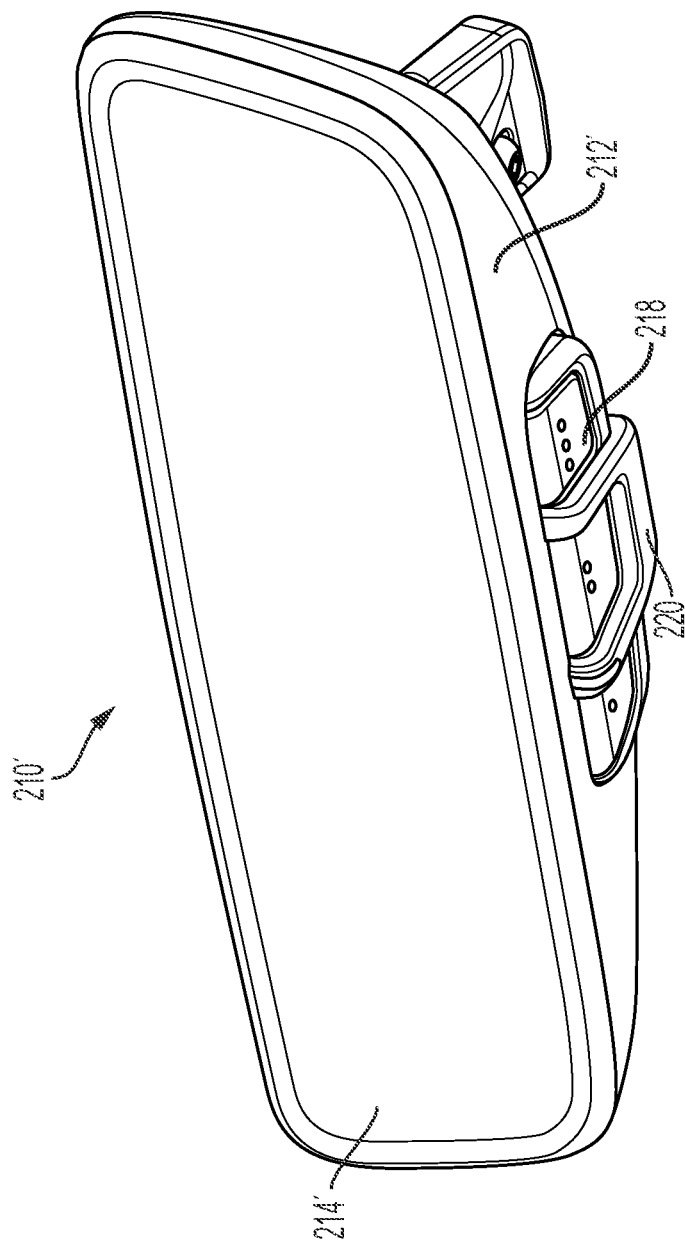
FIG. 30 is a perspective view of the electrochromic mirror assembly, shown with the retaining element closed with the garage door opening module received in the mirror.
Figure 31:
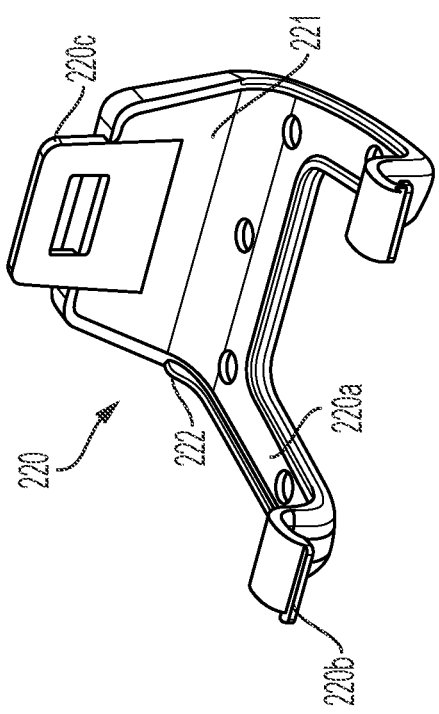
FIG. 31 is a perspective view of the retaining element removed from the mirror assembly.
Figure 32:
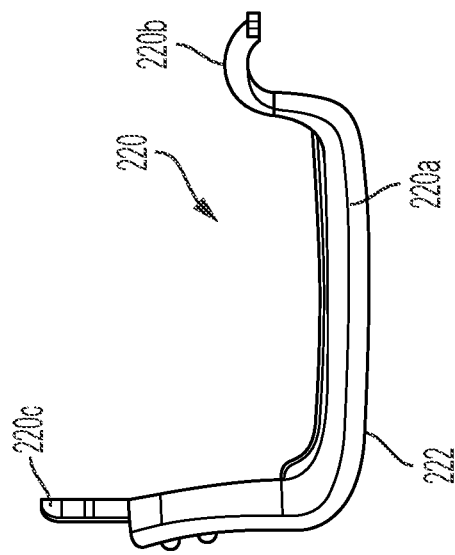
FIG. 32 is a side elevation of the retaining element of FIG. 31.
Figure 33:
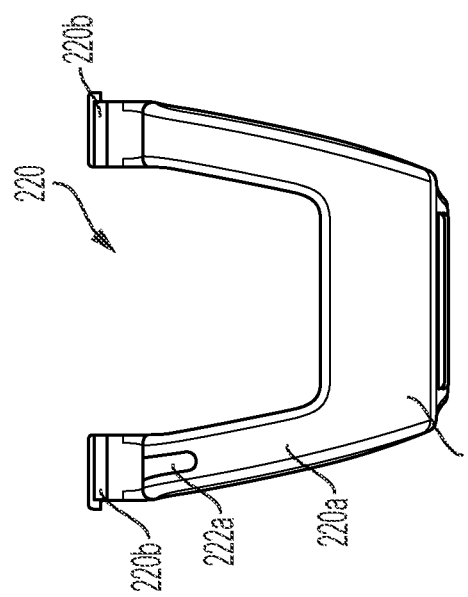
FIG. 33 is a plan view of the outer side of the retaining element.
Figure 34:
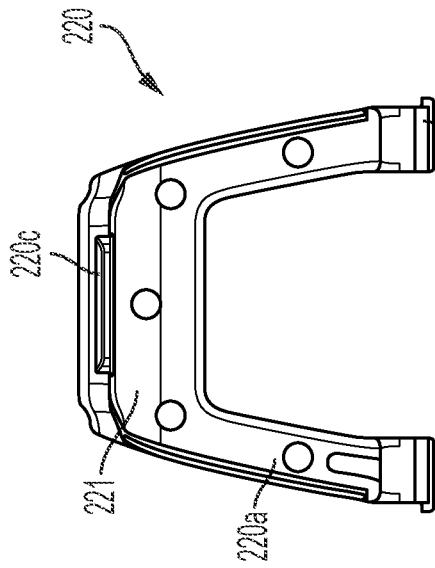
FIG. 34 is a plan view of the inner side of the retaining element.
Figure 38:
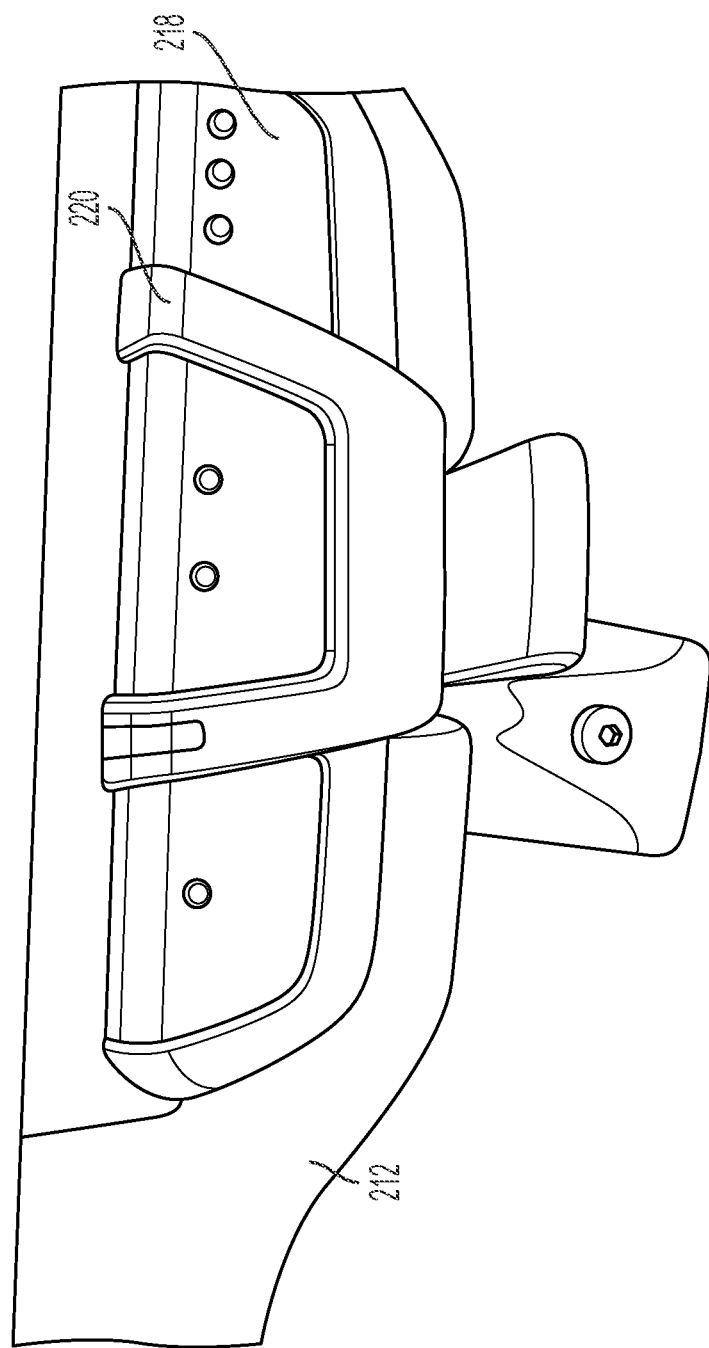
FIG. 38 is a bottom view of the mirror assembly, with the garage door opening module received therein and with the retaining element closed.
Figure 39:
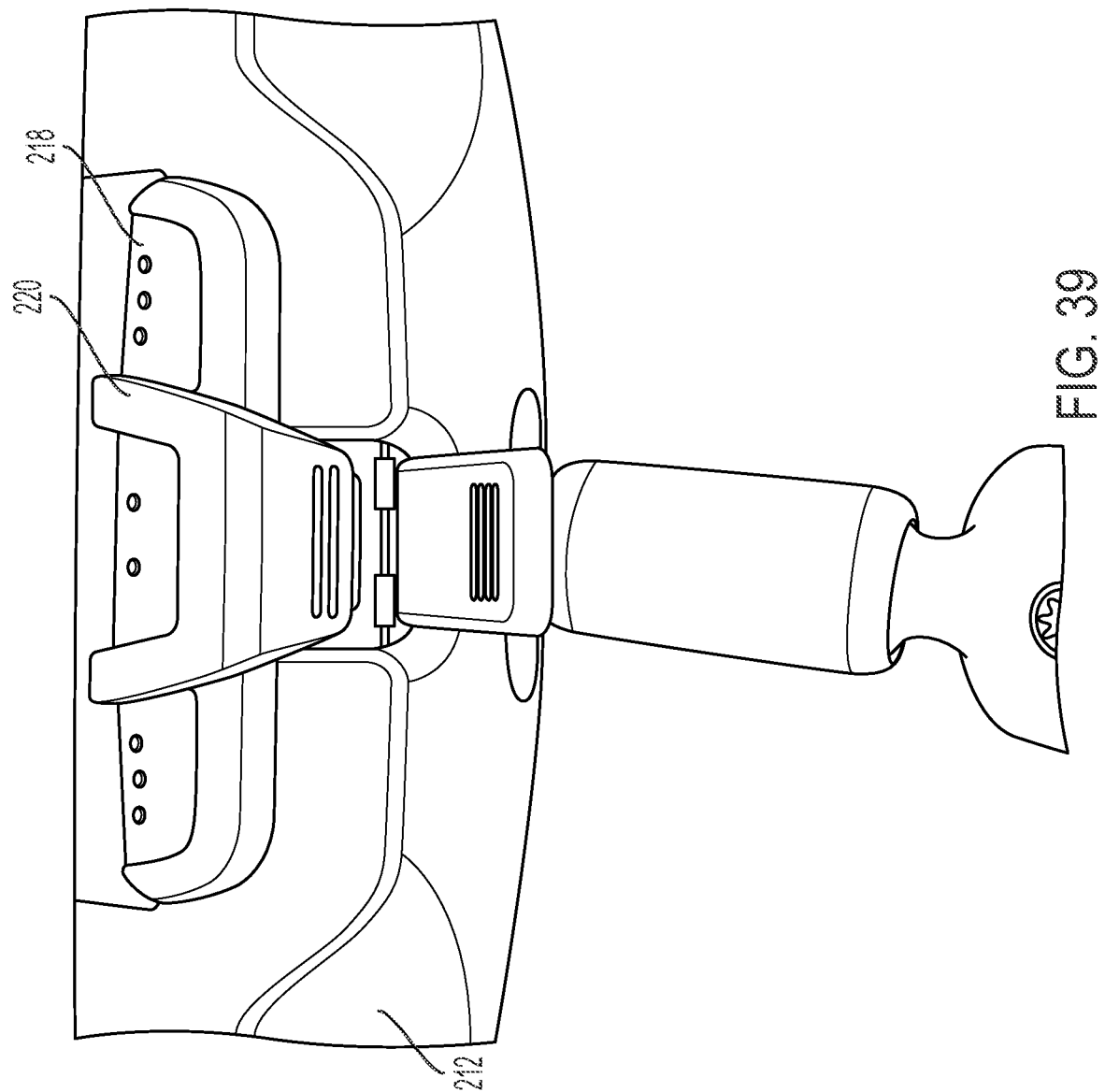
FIG. 39 is another bottom view of the mirror assembly of FIG. 38.

In the illustrated embodiment of FIGS. 24-27, the mirror assembly comprises a prismatic mirror reflective element 214. Optionally, and such as shown in FIGS. 28-30, the mirror assembly 210' may comprise an electro-optic reflective element 214' (such as an electrochromic mirror reflective element). The garage door opening module 218 may be received in the receiving portion 212*a*, 212*a*' of the respective mirror casing 212, 212' and retained therein via the retaining element 220, in a similar manner for either mirror assembly, such that both of the embodiments shown in FIGS. 24-27 and 28-30 need not be discussed in detail herein.

As shown in FIGS. 31-37, the retaining element 220 is formed with two pivot attaching arms or tabs 220*a* that include curved ends 220*b* that pivotally mount or attach at respective pins or stanchions or posts of the mirror casing 212, such as at a forward region of the receiving portion of the mirror casing and between the receiving portion and the mirror reflective element. The retaining element includes a latching element or tab 220*c* at the opposite end from the pivot arms 220*a* for snapping or otherwise attaching to a tab or latching element of the mirror casing, such as at a rearward region of the mirror casing and rearward of the receiving portion of the mirror casing. In the illustrated embodiment, the retaining element 220 comprises an inner clear or transparent or translucent plastic element or portion 221 and an outer opaque or non-light transmitting plastic or metal element or portion 222.

Figure 41:
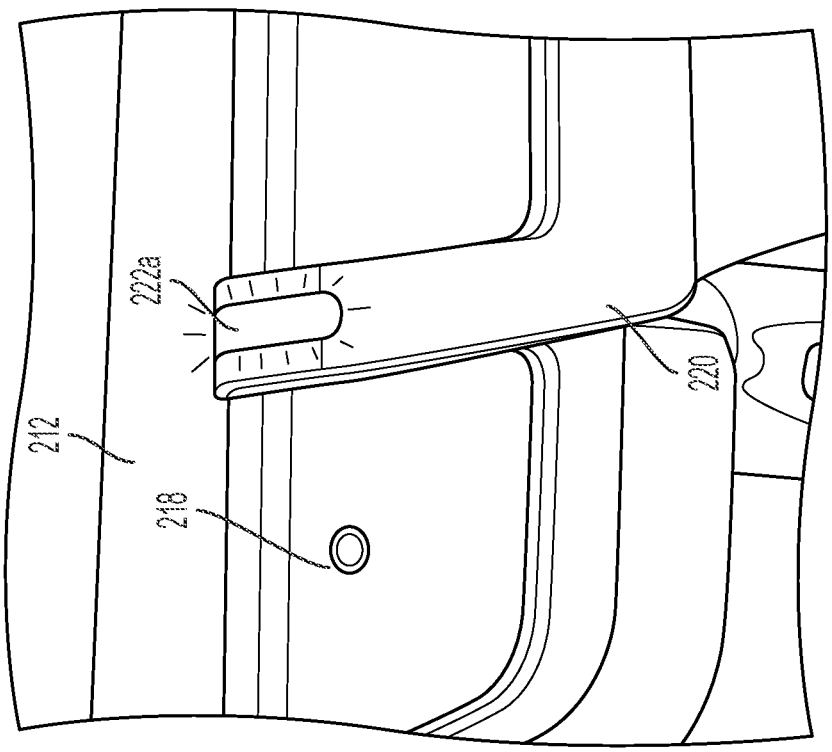
Figure 40:
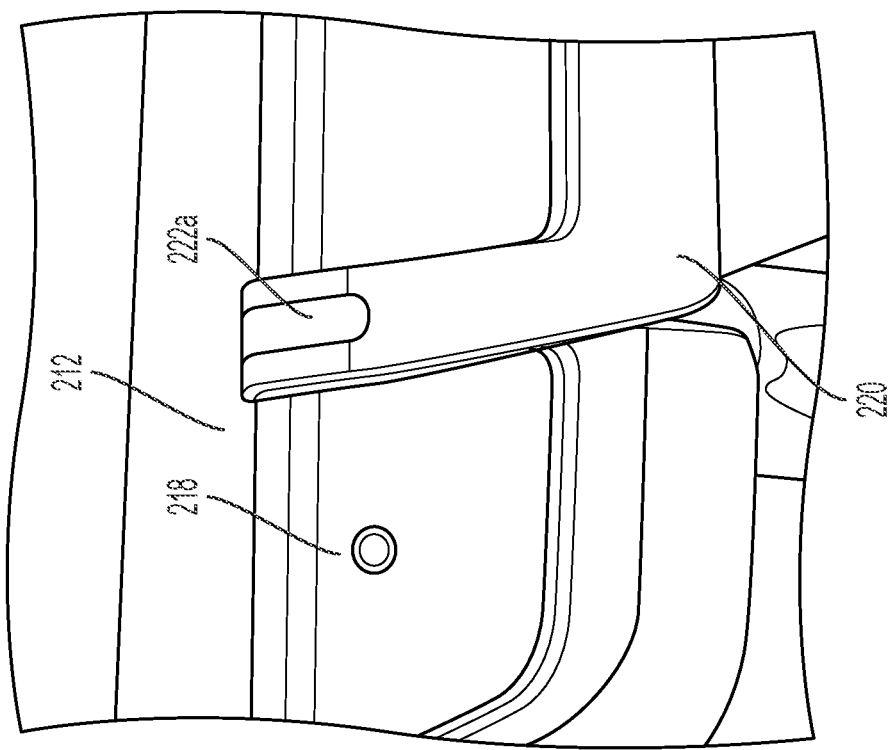
FIG. 40 is an enlarged bottom view of the mirror assembly, showing the retaining element disposed over an indicator of the garage door opening module, with the indicator off.

The outer opaque element or portion 222 includes a slot or aperture 222*a* formed therethrough, such that the inner transparent portion 221 is visible through the slot or aperture (and the inner portion 221 may be formed with a raised portion that is received in the aperture). Thus, and such as can be seen with reference to FIGS. 40 and 41, when the garage door opening module 218 is received in the receiving portion and the retaining element 220 is closed to retain the module in the mirror casing, the aperture 222*a* is generally aligned with an indicator of the garage door opening module, such that, when the indicator is energized (responsive to one of the buttons of the garage door opening module being pressed), illumination emitted by the indicator is viewable through the aperture of the outer opaque portion 222 and through the corresponding viewable portion of the transparent portion 221.

The inner and outer portions may be formed of different materials, such as different plastic materials, with one being more rigid than the other. The inner and outer portions may be separately formed and snapped or otherwise attached together, or they may be molded together, such as via a two shot injection molding process. Optionally, the outer portion may comprise a metallic element or the inner portion may comprise a metallic element (whereby a slot or aperture may be formed through the inner portion or element as well as the outer portion or element).

Figure 43:
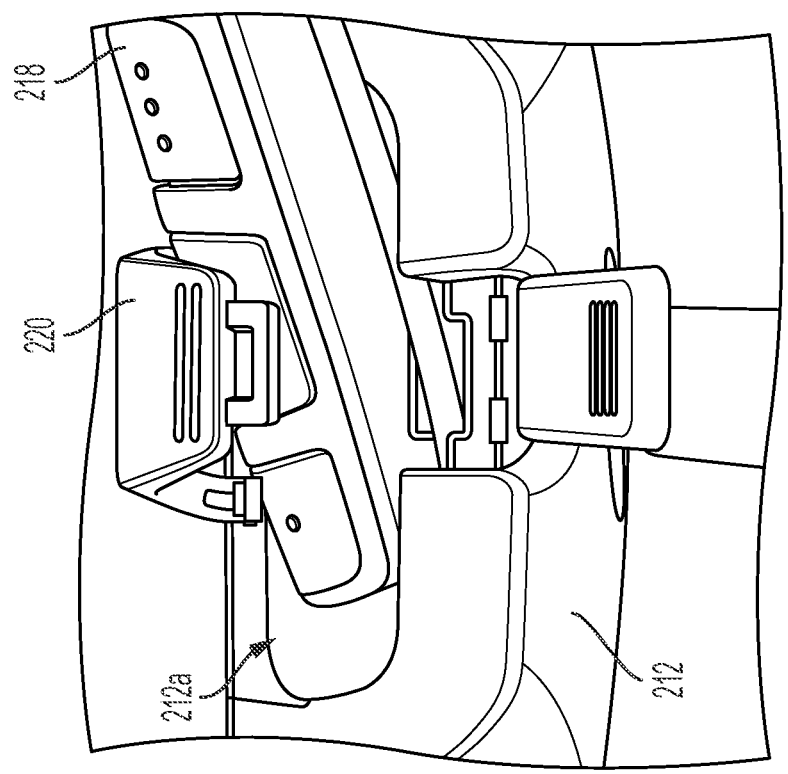
FIG. 43 is another bottom view of the mirror assembly, shown with the retaining element opened and with the garage door opening module being removed from the mirror.
Figure 42:
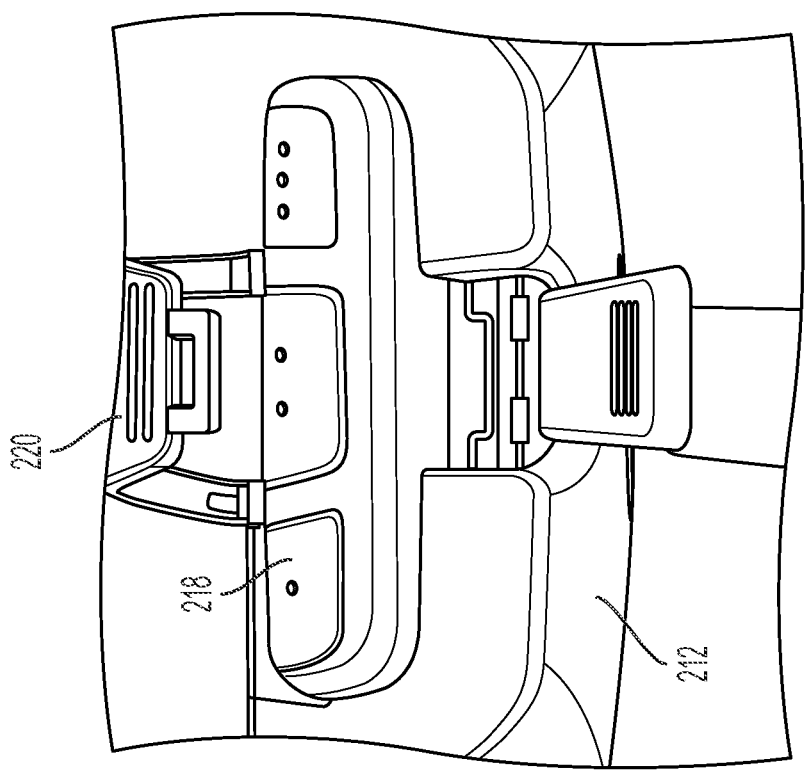
FIG. 42 is a bottom view of the mirror assembly, shown with the retaining element opened and the garage door opening module disposed in the mirror.
Figure 45:
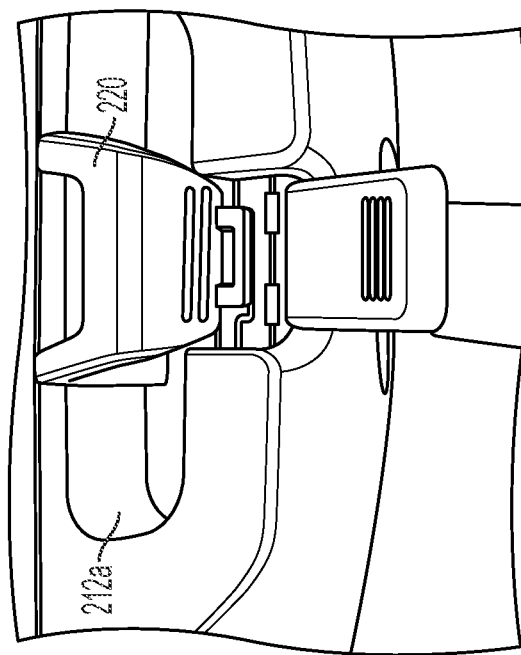
FIGS. 44-49 are bottom views of the mirror assembly, shown with the garage door opening module removed from the mirror.
Figure 46:
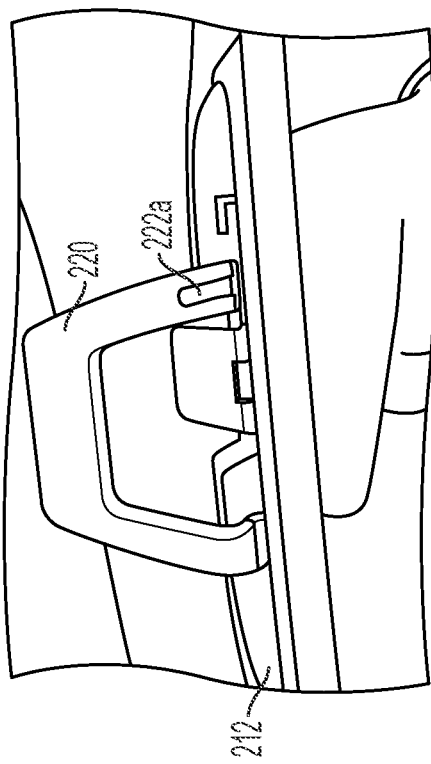
Figure 44:
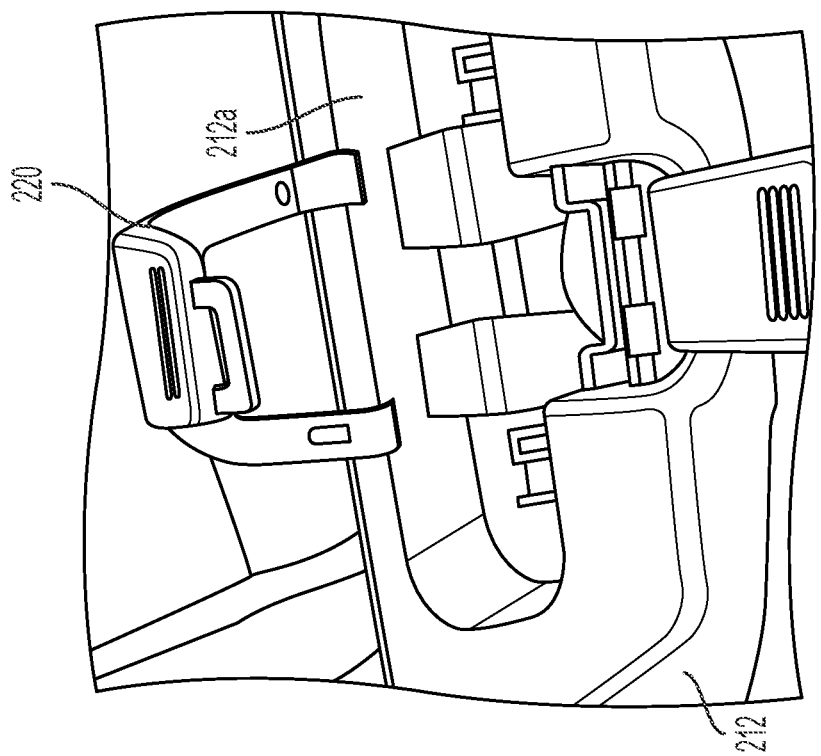
Figure 48:
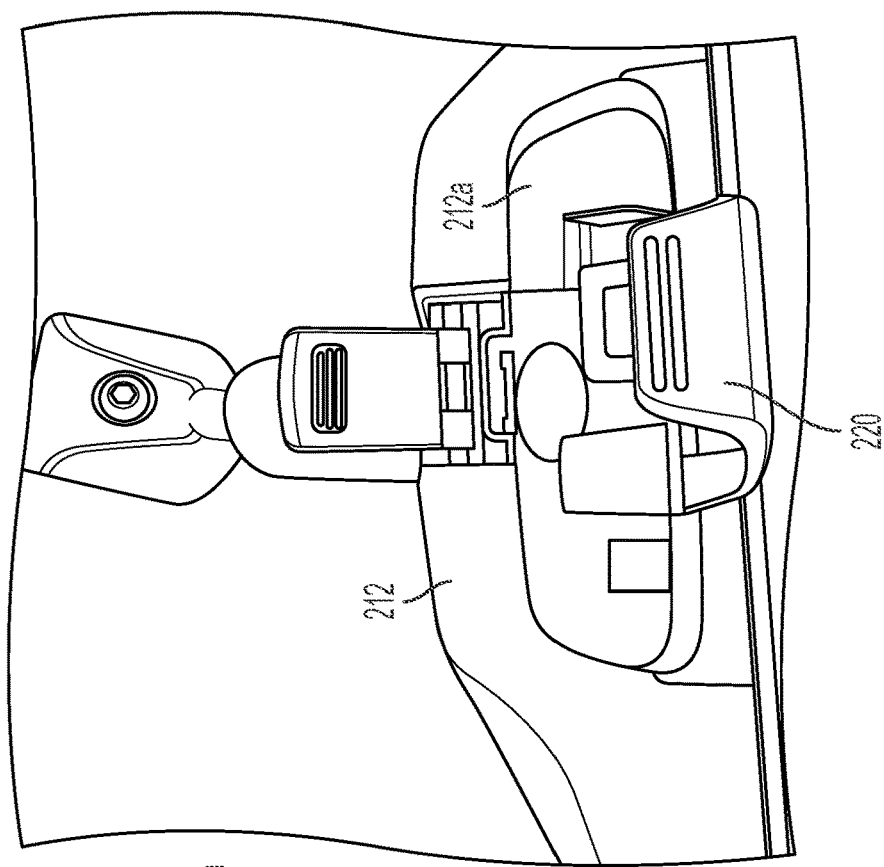
Figure 47:
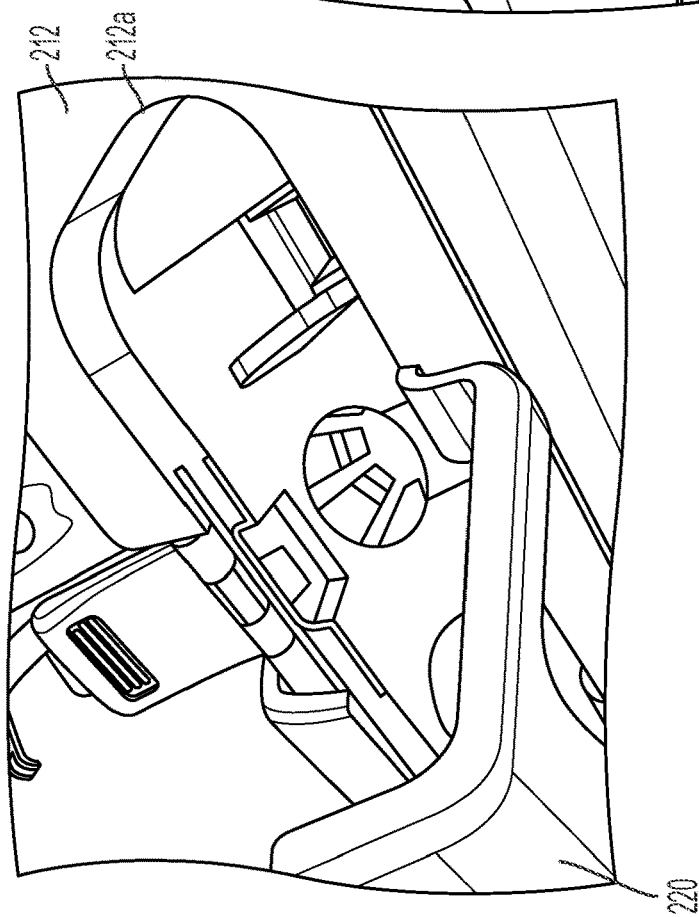
Figure 49:
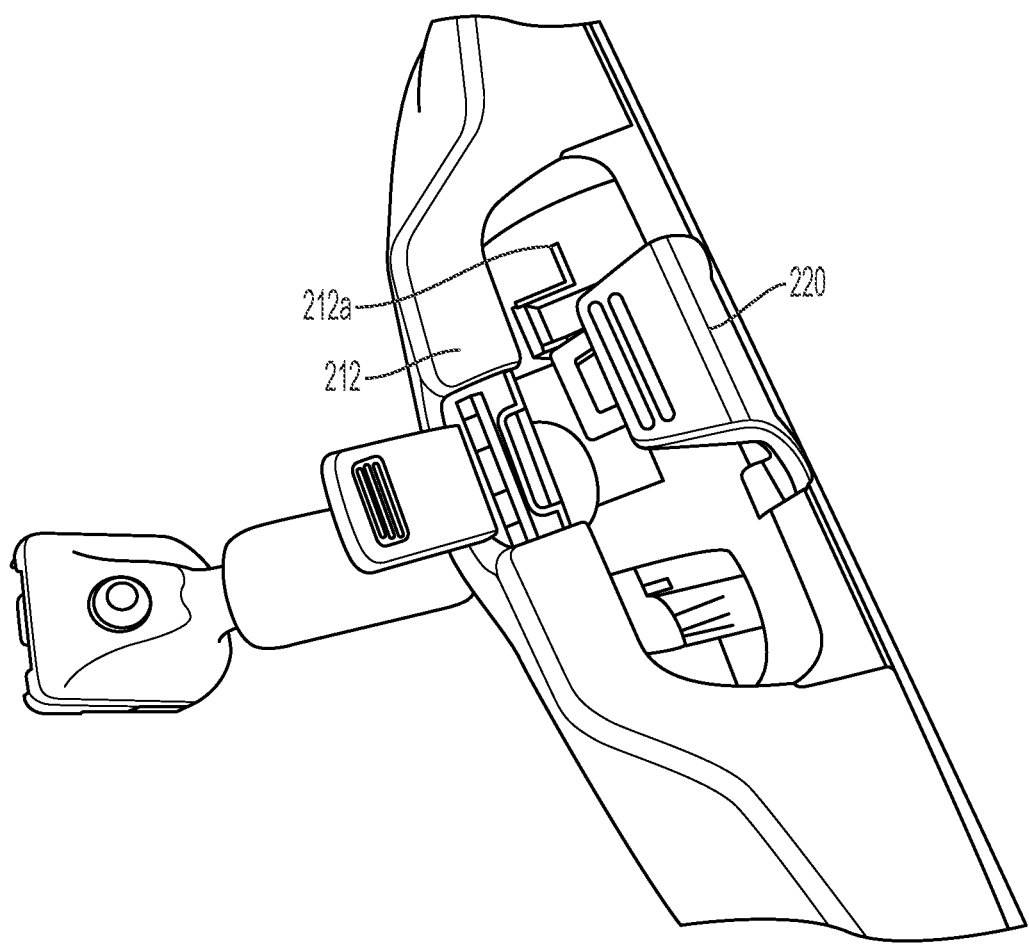

Thus, the retaining element 220 is formed to conform with or correspond with the lower surface of the garage door opening module, such that, when the retaining element is pivotally attached at the mirror casing and pivoted to its closed position with the module in the receiving portion, the retaining element engages and retains or secures the module securely or firmly at the receiving portion. To remove the garage door opening module from the mirror casing, a user can simply press at the rear portion of the retaining element to release the latch (to partially detach the retaining element from the mirror casing) and pivot the retaining element downward away from the garage door opening module (with the retaining element still partially attached or pivotally mounted at the mirror casing via the pivot arms). With the retaining element pivoted to its open position, the garage door opening module can be removed from the mirror casing (see FIGS. 42-43). The garage door opening module may be loosely received in the receiving portion so that it drops out of the receiving portion when the retaining element is opened, or the garage door opening module may be snugly received in the receiving portion or may be otherwise attached or snap-attached or attached via a push-to-release mechanism or the like, such that the garage door opening module does not freely drop out of the receiving portion when the retaining element is opened, but can be readily removed from or pulled from the receiving portion by a user (see FIG. 43).

Figure 50:
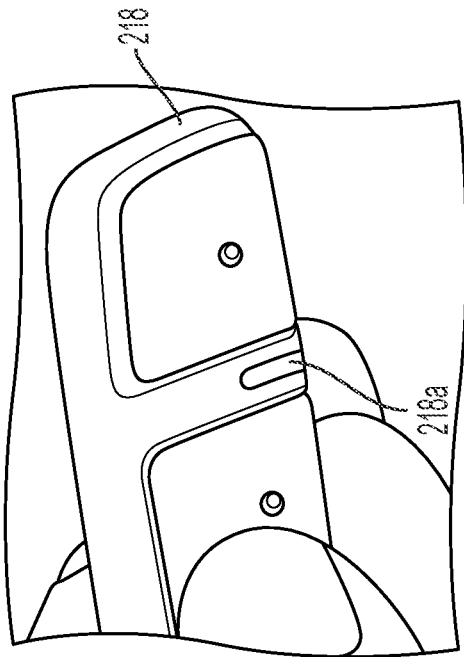
FIG. 50 is a partial view of the garage door opening module removed from the mirror, shown with the indicator off.
Figure 51:
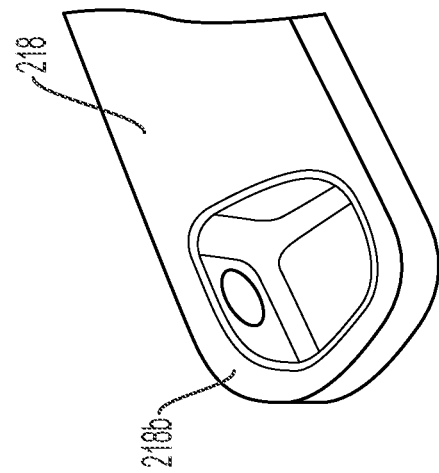

When removed from the receiving portion, the garage door opening module can be carried by the user. The garage door opening module is fully operational whether in the receiving portion or removed from the mirror casing. As shown in FIGS. 50 and 51, the portable self-contained battery operated garage door opening module 218 includes an operation indicator 218*a* (such as a green indicator or LED or the like) that is energized (FIG. 51) when the garage door opening module is actuated (such as by a user pushing at a button of the module when the module is received at the receiving portion of the mirror casing). As discussed above, the retaining element 220 is configured to be disposed over the indicator 218*a* when the retaining element is attached at the mirror casing to retain or secure the module at the mirror casing, whereby light emitted by the indicator 218*a* passes through the retaining element (which may comprise a generally transparent or translucent or tinted or colored or diffuse plastic or polycarbonate element) so as to be viewable and discernible by the user of the garage door opening module.

Figure 52:
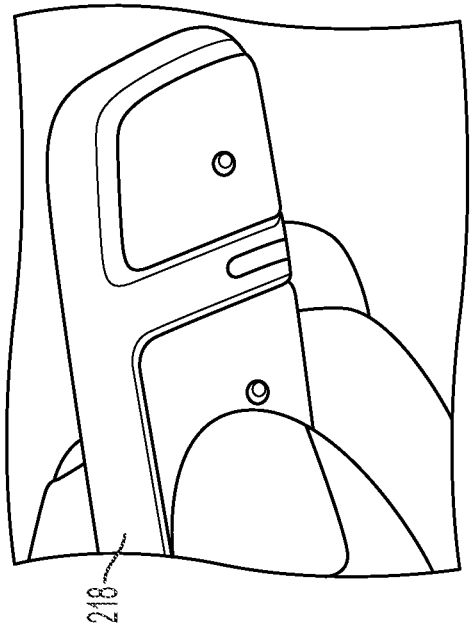
Figure 53:
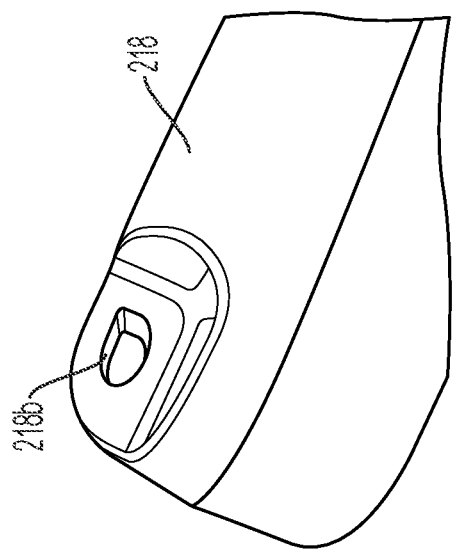

Optionally, and such as shown in FIGS. 52 and 53, the garage door opening module 218 may include an attaching portion or tab 218*b* for attaching the garage door opening module to a key chain or fob or the like when the module is removed from the mirror casing and carried by the user.

Thus, the retaining element may comprise a plastic or polymeric element that is configured to snap attach to the mirror casing at the receiving portion of the mirror casing. The retaining element may comprise a dark or opaque or non-light-transmitting portion and a substantially clear or transparent or translucent or visible light-transmitting portion, which is disposed at or over a light source of the portable self-contained battery operated garage door opening module or over a light source of the mirror assembly or mirror head. The retaining element 220 includes tabs 220*b* and 220*c* for engaging corresponding tabs or elements of the mirror casing to pivotally mount and snap attach the retaining element at and to the mirror casing. The retaining element has a profile or contour that corresponds with the profile or contour of the self-contained garage door opening module to conform with and secure the module in the mirror casing. The retaining element may include a compressible feature at its inner surface to cushion against the garage door opening module and/or the tabs 220*b*, 220*c* may flex when the retaining element is moved to its closed position and urged against the module, such that the retaining element maintains a retaining force at the module to retain the module in the mirror casing and to reduce or eliminate rattle or vibration of the module relative to the mirror casing. The retaining element thus functions to tightly hold the portable self-contained battery operated garage door opening module in place and reduces or substantially precludes rattling of the portable self-contained battery operated garage door opening module relative to the mirror casing or retaining element.

Optionally, the multi-function lens may be painted with laser etching to enhance the driver's or passenger's ability to locate the buttons of the garage door opening module. The laser etching may allow for lighting of symbols or icons or areas. The lens may be substantially proud or above the surface of the buttons to further assist the user in identifying the desired button, such as via visual identification or touch.

Optionally, the lens may provide an alternate function as a warning indicator that draws the driver's eye and attention to the lens and mirror. For example, the lens may be illuminated or may flash or the like responsive to a vehicle system that determines when a rear collision is imminent or likely, so that the driver may look at the mirror and see the rearward approaching vehicle and may maneuver the vehicle to avoid or mitigate the rear collision. Optionally, the lens may be illuminated or may flash responsive to a determination that the driver of the equipped vehicle is approaching another vehicle too quickly or is following too close behind a leading vehicle. Optionally, the lens may be illuminated or flash responsive to a detection of an object in or near the path of travel of the vehicle, such as during a reversing maneuver or parking maneuver of the vehicle. The lens thus may be illuminated or flashed responsive to various vehicle safety or vision systems, such as forward viewing camera systems or rearward viewing camera systems of the vehicle or surround viewing camera systems of the vehicle. Optionally, the lens may provide a decorative cover, with the lighting function accomplished via the internal light source and light pipe discussed above. The cover or retaining element thus may have more of a structural design and may not be limited in its design for the requirements of lighting. The cover or retaining element thus may be designed for locking or securing the self-contained, battery-operated, portable garage door opening module at the receiving portion of the mirror assembly, whereby, when attached at the mirror casing, a portion of the cover interfaces with or abuts or is disposed near an end of the light pipe to receive light therefrom when the light source at the opposite end of the light pipe is actuated, such as in the manner or manners discussed above.

When housed in an interior rearview mirror assembly, the self-contained, battery-operated, portable garage door opening module suitable to use in the present invention is mechanically received at the interior rearview mirror assembly without need to make any electrical connection thereto from the interior rearview mirror assembly itself and/or from any vehicle ignition/battery power source. Thus, the present invention well suits lower-cost, non-electrified prismatic day/night mirrors that mount to a mirror mounting button adhered to an in-cabin surface of the vehicle's windshield but that are not electrically connected to an electrical power source of the vehicle. The portable garage door opening module of the present invention being self-contained and battery-powered, it can be accommodated into an interior rearview mirror assembly and the OEM need not provide an electrical wire harness/connector to provide vehicle electrical power to the interior mirror assembly, thus reducing overall system cost and complexity.

The manufacturer of the interior rearview assembly (such as, for example, Magna Mirrors of America, Inc. of Holland, Mich.) may coordinate with the manufacturer of the portable garage door opening module (for example, The Chamberlain Group of Elmhurst, Ill.) so that the portable unit is securely received by the interior mirror assembly and is readily user-removable therefrom. The interior mirror assembly manufacturer can provide a slot in the lower surface of the mirror casing (or any other surface such as a top or a side surface) and also may provide receiving structure within the cavity of the mirror casing that cooperates with structure of the portable garage door opening module so that, having purchased the portable garage door opening module online or at a store, an occupant of a vehicle equipped with that interior mirror assembly can simply insert the module via the opening provided into the mirror casing and the inserted module snaps in or otherwise mechanically secures in the cavity of the mirror casing until a user desires to remove it therefrom. Such a slot, being such as at the lower surface of the mirror casing or housing, is relatively unobtrusive and non-viewable for a vehicle occupant (such as the driver). Optionally, a flap or flaps or similar structure can be provided to close over the gap in the outer surface of the mirror casing created by the slot present for user-insertion of the module/unit and present for removal of the module.

Optionally, additional features may be added to external display systems and/or to the garage door opening module or mirror assembly. For example, triggering the radio frequency (RF) transmitter of the detachable self-contained battery operated garage door opening module based on vehicle commands or geographical location. Also, on-screen instructions to help the driver with training of the clicker module. This may require the portable garage door opening module to be "listening" for some signal from the vehicle, as opposed to only activating with a button press.

Optionally, a BLUETOOTH® RF radio may be used for some fixed code programming situations (such as BLUETOOTH Low Energy or BTLE). BTLE consumes too much power and would drain the battery too quickly if left active at all times. Thus, the system of the present invention may utilize other sensors as a means to wake-up the portable garage door opening module, and maintain the battery life-time.

There are options that are lower power than the BTLE radio communication, if left continuously active. Optionally, an accelerometer (such as an accelerometer device that has a low power modes with ability to "wake" upon detecting an acceleration above a programmable threshold, where "low power" means less than 10 µA, with some options below 1 µA) may be used that is triggered on door slam or engine start (whereby an output of the triggered accelerometer is used to turn on or wake up the portable garage door opening module. Optionally, a light sensor (such as for sensing visible or IR wavelengths) or a magnetic or magnetoresponsive sensor (Hall Effect Sensor) may be used where an output of the sensor may turn on or wake up the portable garage door opening module. After a wake-up event by one or more sensors, the portable garage door opening module could verify/confirm status using the BTLE link with circuitry or a controller of the mirror assembly or vehicle.

The portable garage door opening module of the present invention can be a member of a suite of portable modules, another of which can be a portable light module (that when being housed in the mirror casing and used in the vehicle can provide likes of a map reading functionality and when removed and used outside the subject equipped vehicle can function as a flashlight.

The inclusion of a portable garage door opening module of the present invention (alone or as a member of a suite of portable modules) can utilize and benefit from constructions disclosed in U.S. Pat. Nos. 7,293,888; 7,012,727; 6,902,284 and/or 6,428,172 (which are hereby incorporated herein by reference in their entireties).

The self-contained, battery-operated, portable garage door opening module suitable to use in the present invention is compact and preferably has a length dimension in the about 2 cm to about 4 cm or so range, a width dimension in the about 2 cm to about 4 cm or so range, and a depth dimension in the about 1 cm to about 2.5 cm or so range.

A blank or push-out or plastic plug element may be provided and present when a portable module of the present invention is not being accommodated within the mirror casing (the mirror head) of the interior mirror assembly in order to fill/cover the slot established in the wall (typically, the underside wall) of the plastic mirror casing that allows the portable module to be inserted into and removed from the mirror head. This blank or push-out or plastic plug element is removable/removed when a portable module is inserted and is replaceable/replaced when the module is removed from the mirror casing.

The manufacturer of the interior rearview mirror assembly can ship interior mirror assemblies with such slots/blank or push-out or plastic plug element present but with no modules included, and leave it to either the vehicle dealership and/or the buyer of a vehicle equipped with such an interior mirror assembly to remove a blank or push-out or plastic plug element.

When the owner of a vehicle equipped with the present invention leaves the equipped vehicle for service at an automobile dealership or service shop or garage or the like, the personnel at that dealership may, as a courtesy or as a promotion, insert the likes of any of the portable modules described herein into an interior rearview mirror assembly of a vehicle that is left for service with its slot/receiving portion unoccupied by a portable module.

Thus, the present invention provides an interior rearview mirror assembly for a vehicle that comprises a mirror head having a mirror casing and a mirror reflective element, and a mirror mounting structure configured to adjustably mount the mirror head at an interior portion of a vehicle equipped with the interior rearview mirror assembly. The mirror assembly includes a receiving portion (that may be established at or through a wall of the mirror casing or may be established at the mirror mounting structure) for receiving a portable self-contained garage door opening module at least partially thereat. The portable self-contained garage door opening module comprises at least one user input and a housing that houses (i) garage door opener circuitry operable under rolling code, (ii) a radio frequency transmitter and (iii) a battery for electrically powering the circuitry. The portable self-contained garage door opening module is operable to wirelessly transmit a radio frequency signal responsive to actuation of the at least one user input of the portable self-contained garage door opening module. With the portable self-contained garage door opening module at least partially received at the receiving portion of the interior rearview mirror assembly, the at least one user input is accessible by a driver of the equipped vehicle. The portable self-contained garage door opening module is configured to cooperate with the receiving portion to releasably secure the portable self-contained garage door opening module at the interior rearview mirror assembly (such as at least partially at the receiving portion), and wherein the portable self-contained garage door opening module is releasable from the interior rearview mirror assembly (such as by cooperating with the receiving portion to release the module from the receiving portion).

Optionally, the receiving portion may be disposed at a lower region of the mirror casing when the interior rearview mirror assembly is mounted at the equipped vehicle. For example, the receiving portion may comprise an opening established through a wall (such as a lower wall) of the mirror casing. Optionally, the opening may comprise a slot established through the wall of the mirror casing. Optionally, at least one flap may be provided that covers the opening when the portable self-contained garage door opening module is not received at the receiving portion of the mirror casing. Optionally, the receiving portion may be disposed at the mirror mounting structure.

Optionally, the portable self-contained garage door opening module includes a visual indicator that is activated responsive to actuation of the at least one user input. The visual indicator may be disposed at a portion of the portable self-contained garage door opening module that is exposed when the portable self-contained garage door opening module is at least partially received at the receiving portion. The receiving portion may be disposed at the mirror casing with the visual indicator disposed behind the mirror reflective element when the portable self-contained garage door opening module is at least partially received at the receiving portion of the mirror casing, and the visual indicator, when activated, is viewable through the mirror reflective element by the driver of the equipped vehicle. Optionally, the at least one user input may comprise a glowing phosphorescent material.

Optionally, the portable self-contained garage door opening module cooperates with the receiving portion via a push-to-release mechanism, and the portable self-contained garage door opening module is pushed into the receiving portion to engage the push-to-release mechanism for releasably securing the portable self-contained garage door opening module at least partially at the receiving portion. The portable self-contained garage door opening module, when releasably secured at the receiving portion, is pushed to release the portable self-contained garage door opening module from the push-to-release mechanism of the receiving portion.

Optionally, the portable self-contained garage door opening module may be configured to cooperate with the receiving portion via a fastener that secures the portable self-contained garage door opening module at the receiving portion.

Optionally, a cover or retaining element is configured to attach at the receiving portion (such as at the mirror casing at or near an opening of the receiving portion that at least partially receives the portable self-contained garage door opening module thereat) to releasably secure the portable self-contained garage door opening module at the receiving portion. The retaining element is configured to receive light from a light source within the mirror assembly and, when the light source is activated, the retaining element is illuminated. The light source may be activated responsive to a system of the vehicle and the retaining element is illuminated to alert a person viewing the retaining element. Optionally, the light source may be activated responsive to an ambient light sensor, whereby the retaining element is illuminated when the light source is activated to enhance awareness by a driver of the equipped vehicle of the presence of the portable self-contained garage door opening module releasably secured at the receiving portion in low lighting conditions, and so as to enhance viewability of the portable self-contained garage door opening module at least partially secured at the receiving portion in low lighting conditions. The light source may comprise a light emitting diode disposed at a circuit board of the mirror head, and a light pipe may direct light emitted by the light emitting diode towards the retaining element.

Optionally, the portable self-contained garage door opening module may comprise a member of a suite of portable modules, each configured for releasable cooperation with the receiving portion to releasably secure the portable module of the suite of portable modules at least partially at the receiving portion. For example, another member of the suite of portable modules may comprise a battery-operated light, which may include at least one white light emitting light emitting diode. Another member of the suite of portable modules may comprise an air freshener or a perfumer or the like.

Optionally, the mirror assembly may provide a wireless battery charging feature, such as for charging the battery of the portable self-contained garage door opening module when the portable self-contained garage door opening module is in the vehicle and/or inserted into the mirror assembly. The mirror head or mirror assembly may be selected as the location for a wireless charger or wireless charging device or system because it may house a wireless transmitter in the vehicle and in an area near where occupants of the vehicle (such as a driver and passenger) may set a device that needs charging. Also, since the portable self-contained garage door opening module may often be placed or plugged into the mirror head, a wireless battery charging feature may allow for use of a smaller and less expensive rechargeable battery for the portable self-contained garage door opening module (and would not require wiring terminals or connectors for electrically plugging in the module to directly charge the battery when the module is inserted into the mirror head). Also, since a prismatic universal garage door opener (UGDO) mirror assembly may include its own battery, and an electrochromic UGDO mirror may also contain a battery that is wired for the operation of the EC feature, the wireless charging and thus associated rechargeable battery for the mirror may offer battery size reduction and a cost reduction for the UGDO feature. Thus, the EC/prismatic UGDO mirrors may be powered by a rechargeable battery as well as locate a wireless transmitter for recharging their own battery and batteries of other devices at the mirror head or in the vehicle.

Optionally, a wireless battery charging transmitter may be disposed in the interior rearview mirror assembly (that may or may not have the port for a portable self-contained garage door opening module), whereby the mirror provides wireless charging for various wirelessly chargeable devices present in the vehicle (such as smartphones and the like). The location of the mirror assembly places the wireless charging device and transmitter away from the sheet metal of the vehicle, which can adversely affect transmission by the charging transmitter. Thus, by placing a wireless battery charger in an interior rearview mirror assembly (such as in the mirror head), the wireless battery charger achieves enhanced transmission and reception and thus enhanced charging of batteries of devices located in the vehicle, such as a battery powered portable self-contained garage door opening module and/or battery powered smart phones and/or tablets and/or the like.

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled perimeter edge around the reflective element and with no overlap onto the front surface of the reflective element (such as by utilizing aspects of the mirror assemblies described in U.S. Pat. Nos. 7,360,932; 8,049,640; 8,277,059 and/or 8,529,108 (which are hereby incorporated herein by reference in their entireties), or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Pat. No. 8,508,831 and/or International Publication Nos. WO 2010/124064; WO 2011/044312; WO 2012/051500 and/or WO 2013/071070, which are hereby incorporated herein by reference in their entireties (and with electrochromic and prismatic mirrors of such construction are commercially available from the assignee of this application under the trade name INFINITY™ mirror).

The mirror reflective element may comprise any suitable reflective element, such as an electro-optic (such as electrochromic) reflective element or a prismatic reflective element. The mirror casing may include a bezel portion that circumscribes a perimeter region of the front surface of the reflective element or the reflective element may comprise a frameless reflective element, such as a frameless reflective element. For example, and such as can be seen with reference to FIGS. 16, 20, 24-30, the mirror reflective element may comprise a glass substrate having a perimeter edge, with the perimeter edge of the glass substrate being exposed to and viewable by the driver of the vehicle when the interior rearview mirror assembly is normally mounted in the vehicle, and with the perimeter edge of said glass substrate comprising a curved surface disposed between a front surface of the glass substrate and the mirror casing.

Optionally, for example, the reflective element may comprise a laminate construction variable reflectance electro-optic (such as electrochromic) reflective element assembly having a front substrate and a rear substrate with an electro-optic medium (such as electrochromic medium) sandwiched therebetween and bounded by a perimeter seal. The front substrate has a front or first surface (the surface that generally faces the driver of a vehicle when the mirror assembly is normally mounted at the vehicle) and a rear or second surface opposite the front surface, and the rear substrate has a front or third surface and a rear or fourth surface opposite the front surface, with the electro-optic medium disposed between the second surface and the third surface and bounded by the perimeter seal of the reflective element (such as is known in the electrochromic mirror art). The second surface has a transparent conductive coating established thereat (such as an indium tin oxide (ITO) layer, or a doped tin oxide layer or any other transparent electrically semi-conductive layer or coating or the like (such as indium cerium oxide (ICO), indium tungsten oxide (IWO), or indium oxide (IO) layers or the like or a zinc oxide layer or coating, or a zinc oxide coating or the like doped with aluminum or other metallic materials, such as silver or gold or the like, or other oxides doped with a suitable metallic material or the like), while the third surface has a metallic reflector coating (or multiple layers or coatings) established thereat. The front or third surface of rear substrate may include one or more transparent semi-conductive layers (such as an ITO layer or the like), and one or more metallic electrically conductive layers (such as a layer of silver, aluminum, chromium or the like or an alloy thereof). The mirror reflector may comprise any suitable coatings or layers, such as a transflective coating or layer, such as described in U.S. Pat. Nos. 7,274,501; 7,255,451 and/or 7,184,190, which are hereby incorporated herein by reference in their entireties, disposed at the front surface of the rear substrate (commonly referred to as the third surface of the reflective element) and opposing the electro-optic medium, such as an electrochromic medium disposed between the front and rear substrates and bounded by the perimeter seal (but optionally, the mirror reflector could be disposed at the rear surface of the rear substrate (commonly referred to as the fourth surface of the reflective element), while remaining within the spirit and scope of the present invention).

Optionally, it is envisioned that the mirror assembly may comprise a prismatic reflective element, while remaining within the spirit and scope of the present invention. The prismatic mirror assembly may be mounted or attached at an interior portion of a vehicle (such as at an interior surface of a vehicle windshield) via the mounting means described above, and the reflective element may be toggled or flipped or adjusted between its daytime reflectivity position and its nighttime reflectivity position via any suitable toggle means. Optionally, for example, the interior rearview mirror assembly may comprise a prismatic mirror assembly. Optionally, the prismatic reflective element may comprise a conventional prismatic reflective element or prism or any other suitable element, without affecting the scope of the present invention.

Optionally, the interior rearview mirror assembly may include circuitry therein (such as at a printed circuit board or the like disposed within the mirror casing, and electrical connection to the circuitry may be made via an electrical lead or connector of a wiring harness of the vehicle. Optionally, the electrical connector may be received through the mirror casing and through an aperture established through the toggle element, such as by utilizing aspects of the mirror assemblies described in U.S. Pat. No. 5,798,688 and/or U.S. Publication No. US-2010-0085653, which are hereby incorporated herein by reference in their entireties.

The mirror assembly may include user actuatable inputs operable to control any of the accessories of or associated with the mirror assembly and/or an accessory module or the like. For example, the mirror assembly may include touch sensitive elements or touch sensors or proximity sensors, such as the types of touch sensitive elements described in U.S. Pat. Nos. 5,594,222; 6,001,486; 6,310,611; 6,320,282; 6,627,918 and/or 7,253,723, and/or International Publication Nos. WO 2012/051500 and/or WO 2013/071070, which are hereby incorporated herein by reference in their entireties, or such as proximity sensors of the types described in U.S. Pat. Nos. 7,224,324; 7,249,860 and/or 7,446,924, and/or International Publication No. WO 2004/058540, which are hereby incorporated herein by reference in their entireties, or such as membrane type switches, such as described in U.S. Pat. No. 7,360,932, which is hereby incorporated herein by reference in its entirety, or such as detectors and the like, such as the types disclosed in U.S. Pat. Nos. 6,504,531; 6,501,465; 6,492,980; 6,452,479; 6,437,258 and/or 6,369,804, which are hereby incorporated herein by reference in their entireties, and/or the like, while remaining within the spirit and scope of the present invention.

Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255,442; 5,632,092; 5,798,688; 5,971,552; 5,924,212; 6,243,003; 6,278,377; 6,420,975; 6,477,464; 6,946,978; 7,308,341; 7,167,796; 7,004,593; 7,657,052 and/or 6,678,614, and/or U.S. Publication No. US-2006-0050018, which are all hereby incorporated herein by reference in their entireties.

Optionally, the mirror assembly may include one or more other displays, such as display-on-demand transflective type displays, and/or video displays or display screens, such as the types disclosed in U.S. Pat. Nos. 9,041,806; 8,890,955; 7,855,755; 7,338,177; 7,046,448; 5,530,240; 6,329,925; 7,734,392; 7,370,983; 6,420,975; 5,416,313; 5,285,060; 5,193,029 and/or 4,793,690, and/or in U.S. Publication Nos. US-2006-0061008; US-2006-0050018; US-2009-0015736; US-2009-0015736 and/or US-2010-0097469, which are all hereby incorporated herein by reference in their entireties.

The video display screen may be controlled or operable in response to an input or signal, such as a signal received from one or more cameras or image sensors of the vehicle, such as a video camera or sensor, such as a CMOS imaging array sensor, a CCD sensor or the like, and image processors or image processing techniques, such as utilizing aspects of the cameras and image processors described U.S. Pat. Nos. 6,690,268; 6,498,620; 6,396,397; 6,201,642; 5,877,897; 5,796,094; 5,715,093; 6,922,292; 6,590,719; 6,559,435; 6,831,261; 6,806,452; 6,822,563; 6,946,978; 7,038,577; 7,004,606 and/or 7,720,580, and/or U.S. Pat. Pub. Nos. US-2006-0171704; US-2009-0244361 and/or US-2010-0214791, and/or International Publication Nos. WO 2009/046268 and/or WO 2009/036176, which are all hereby incorporated herein by reference in their entireties, or from one or more imaging systems of the vehicle, such as a reverse or backup aid system, such as a rearwardly directed vehicle vision system, a trailer hitching aid or tow check system, a cabin viewing or monitoring device or system, such as a baby viewing or rear seat viewing camera or device or system or the like, a video communication device or system, and/or the like. The imaging sensor or camera may be activated and the display screen may be activated in response to the vehicle shifting into reverse, such that the display screen is viewable by the driver and is displaying an image of the rearward scene while the driver is reversing the vehicle. It is envisioned that an image processor or controller (such as an EyeQ™ image processing chip available from Mobileye Vision Technologies Ltd. of Jerusalem, Israel, and such as an image processor of the types described in International Pub. No. WO 2010/099416, which is hereby incorporated herein by reference in its entirety) may process image data captured by the rearward facing camera to assess glare lighting conditions (such as to detect headlights of following vehicles that may cause glare at the interior and/or exterior rearview mirror assemblies of the equipped vehicle), and the controller may adjust or control the dimming of the electro-optic mirror assembly or assemblies of the equipped vehicle responsive to such image processing.

Optionally, the mirror assembly may include one or more other accessories at or within the mirror casing, such as one or more electrical or electronic devices or accessories, such as antennas, including global positioning system (GPS) or cellular phone antennas, a communication module, a blind spot detection system, transmitters and/or receivers, a digital network, a high/low headlamp controller, a memory mirror system, a hands-free phone attachment, a video device for internal cabin surveillance and/or video telephone function, a remote keyless entry receiver, lights, such as map reading lights or one or more other lights or illumination sources, microphones, speakers, a voice recorder, an imaging system or components or circuitry or display thereof, such as an imaging and/or display system, a video device for internal cabin surveillance (such as for sleep detection or driver drowsiness detection or the like), a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver, and/or any other accessory or circuitry or the like.

The mirror assembly may comprise or utilize aspects of other types of casings or the like, such as described in U.S. Pat. Nos. 7,249,860; 6,439,755; 4,826,289 and/or 6,501,387, which are all hereby incorporated herein by reference in their entireties, without affecting the scope of the present invention. Optionally, the mirror assembly may comprise a modular mirror construction, and may include back housing portions or the like, such as cap portions of the types described in U.S. Pat. No. 7,289,037, which is hereby incorporated herein by reference in its entirety. Optionally, the mirror casing and/or reflective element may include customized or personalized viewable characteristics, such as color or symbols or indicia selected by the vehicle manufacturer or owner of the vehicle, such as the customization characteristics described in U.S. Pat. No. 7,626,749, which is hereby incorporated herein by reference in its entirety.

Optionally, the accessory or accessories, such as those described above, may be positioned at or within the mirror casing and/or mirror cap portion or the like, and may be included on or integrated in a printed circuit board positioned within the mirror casing and/or cap portion, such as along a rear surface of the reflective element or elsewhere within a cavity defined by the casing, without affecting the scope of the present invention. The user actuatable inputs and/or touch sensors and/or proximity sensors and displays described above may be actuatable to control and/or adjust the accessories of the mirror assembly/system and/or overhead console and/or accessory module and/or vehicle. The connection or link between the controls and the display screen device and/or the navigation system and/or other systems and accessories of the mirror system may be provided via vehicle electronic or communication systems and the like, and may be connected via various protocols or nodes, such as BLUETOOTH®, SCP, UBP, J1850, CAN J2284, Fire Wire 1394, MOST, LIN, FlexRay™, Byte Flight and/or the like, or other vehicle-based or in-vehicle communication links or systems (such as WIFI and/or IRDA) and/or the like, or via VHF or UHF or other wireless transmission formats, depending on the particular application of the mirror/accessory system and the vehicle. Optionally, the connections or links may be provided via various wireless connectivity or links, without affecting the scope of the present invention.

Changes and modifications in the specifically described embodiments may be carried out without departing from the principles of the present invention, which is intended to be limited only by the scope of the appended claims as interpreted according to the principles of patent law.

The invention claimed is:

1. An interior rearview mirror assembly for a vehicle, said interior rearview mirror assembly comprising:
   a mirror head comprising a mirror casing and a mirror reflective element;
   a mirror mounting structure configured to adjustably mount said mirror head at an interior portion of a vehicle equipped with said interior rearview mirror assembly;
   a receiving portion for receiving a portable self-contained garage door opening module;
   wherein said receiving portion is disposed at a lower region of said mirror casing when said interior rearview mirror assembly is mounted at the equipped vehicle, and wherein said receiving portion comprises an opening established through a wall of said mirror casing;
   wherein said portable self-contained garage door opening module comprises a user input and a housing that houses (i) garage door opener circuitry operable under rolling code, (ii) a radio frequency transmitter and (iii) a battery for electrically powering said circuitry, and wherein said portable self-contained garage door opening module is operable to wirelessly transmit a radio frequency signal responsive to actuation of said user input of said portable self-contained garage door opening module;
   wherein, with said portable self-contained garage door opening module received at said receiving portion of said interior rearview mirror assembly and with said mirror mounting structure mounted at the interior portion of the equipped vehicle, said user input is accessible by a driver of the equipped vehicle;
   a retaining element configured to attach at said mirror casing at said receiving portion, wherein said retaining element is separate from said portable self-contained garage door opening module and is at least partially external to said mirror casing;
   wherein, with said retaining element at least partially detached from said mirror casing, said portable self-contained garage door opening module is insertable into and removable from said receiving portion; and
   wherein, with said portable self-contained garage door opening module inserted into and received at said receiving portion and with said retaining element attached at said mirror casing, said retaining element overlaps a lower portion of said portable self-contained garage door opening module to secure said portable self-contained garage door opening module at said receiving portion.

2. The interior rearview mirror assembly of claim 1, wherein said retaining element comprises a plastic element having a portion that snap attaches at said lower region of said mirror casing.

3. The interior rearview mirror assembly of claim 2, wherein said retaining element comprises a compressible feature that engages said portable self-contained garage door opening module and compresses against said portable self-contained garage door opening module when said retaining element is snap attached at said lower region of said mirror casing with said portable self-contained garage door opening module inserted into and received at said receiving portion.

4. The interior rearview mirror assembly of claim 1, wherein said retaining element pivotally mounts at said mirror casing and pivots between an opened position, where said portable self-contained garage door opening module is insertable into and removable from said receiving portion, and a closed position, where said portable self-contained garage door opening module, when inserted into and received at said receiving portion, is secured by said retaining element at said receiving portion.

5. The interior rearview mirror assembly of claim 4, wherein said retaining element pivotally mounts at said mirror casing via a pair of mounting arms that pivotally engage said mirror casing.

6. The interior rearview mirror assembly of claim 5, wherein said retaining element comprises a latch that attaches at a latching portion of said mirror casing when said retaining element is in the closed position.

7. The interior rearview mirror assembly of claim 1, wherein said portable self-contained garage door opening module comprises a light source that illuminates when said user input is actuated, and wherein, with said portable self-contained garage door opening module inserted into and received at said receiving portion and with said retaining element attached to secure said portable self-contained garage door opening module at said receiving portion, light emitted by said light source passes through said retaining element.

8. The interior rearview mirror assembly of claim 7, wherein said retaining element comprises an opaque portion and a translucent or transparent portion, and wherein, with said portable self-contained garage door opening module inserted into and received at said receiving portion and with said retaining element attached to secure said portable self-contained garage door opening module at said receiving portion, said translucent or transparent portion is disposed at said light source of said portable self-contained garage door opening module.

9. The interior rearview mirror assembly of claim 1, wherein said retaining element is configured to receive light emitted by a light source accommodated by said interior rearview mirror assembly and wherein, when said light source is activated, at least a portion of said retaining element is illuminated.

10. The interior rearview mirror assembly of claim 9, wherein said light source accommodated by said interior rearview mirror assembly is activated responsive to a system of the vehicle and said retaining element is illuminated to alert a person viewing said retaining element.

11. The interior rearview mirror assembly of claim 9, wherein said light source accommodated by said interior rearview mirror assembly is activated responsive to an ambient light sensor, and wherein said retaining element is illuminated when said light source is activated to, with said mirror mounting structure mounted at the interior portion of the equipped vehicle, enhance awareness by the driver of the equipped vehicle of the presence of said portable self-contained garage door opening module releasably secured at said receiving portion in low lighting conditions.

12. The interior rearview mirror assembly of claim 9, wherein said light source accommodated by said interior rearview mirror assembly comprises a light emitting diode disposed at a circuit board of said mirror head, and wherein a light pipe directs light emitted by said light emitting diode towards said retaining element.

13. The interior rearview mirror assembly of claim 1, comprising a wireless battery charging device.

14. The interior rearview mirror assembly of claim 13, wherein said wireless battery charging device is operable to wirelessly charge the battery of said portable self-contained garage door opening module when said portable self-contained garage door opening module is inserted into and received at said receiving portion of said mirror head.

15. The interior rearview mirror assembly of claim 1, wherein, with said portable self-contained garage door opening module inserted into and received at said receiving portion of said mirror head, said portable self-contained garage door opening module, responsive to actuation of said user input, wirelessly transmits a radio frequency signal to open a garage door, and wherein, with said portable self-contained garage door opening module removed from said receiving portion of said mirror head, said portable self-contained garage door opening module, responsive to actuation of said user input, wirelessly transmits the radio frequency signal to open the garage door.

16. An interior rearview mirror assembly for a vehicle, said interior rearview mirror assembly comprising:
a mirror head comprising a mirror casing and a mirror reflective element;
a mirror mounting structure configured to adjustably mount said mirror head at an interior portion of a vehicle equipped with said interior rearview mirror assembly;
a receiving portion for receiving a portable self-contained garage door opening module;
wherein said receiving portion is disposed at a lower region of said mirror casing when said interior rearview mirror assembly is mounted at the equipped vehicle, and wherein said receiving portion comprises an opening established through a wall of said mirror casing;
wherein said portable self-contained garage door opening module comprises a user input and a housing that houses (i) garage door opener circuitry operable under rolling code, (ii) a radio frequency transmitter and (iii) a battery for electrically powering said circuitry, and wherein said portable self-contained garage door opening module is operable to wirelessly transmit a radio frequency signal responsive to actuation of said user input of said portable self-contained garage door opening module;
wherein, with said portable self-contained garage door opening module received at said receiving portion of said interior rearview mirror assembly and with said mirror mounting structure mounted at the interior portion of the equipped vehicle, said user input is accessible by a driver of the equipped vehicle;
a retaining element pivotally attached at said mirror casing at said receiving portion, wherein said retaining element is separate from said portable self-contained garage door opening module and is at least partially external to said mirror casing;
wherein said retaining element comprises a plastic element having (i) a pivot portion that pivotally mounts said retaining element at said lower region of said mirror casing and (ii) a latch at an end of said retaining element distal from said pivot portion;
wherein said retaining element is pivotable between an opened position, where said retaining element does not block said receiving portion, and a closed position, where said retaining element spans a portion of said receiving portion;
wherein, when pivoted to the closed position, said latch of said retaining element snap-connects to said mirror casing to retain said retaining element in the closed position;
wherein, with said retaining element in the open position, said portable self-contained garage door opening module is insertable into and removable from said receiving portion; and
wherein, with said portable self-contained garage door opening module inserted into and received at said receiving portion and with said retaining element retained in the closed position, said retaining element overlaps a lower portion of said portable self-contained garage door opening module to secure said portable self-contained garage door opening module at said receiving portion.

17. The interior rearview mirror assembly of claim 16, wherein said retaining element comprises a compressible feature that engages said portable self-contained garage door opening module and compresses against said portable self-contained garage door opening module when said retaining element is snap attached at said lower region of said mirror casing with said portable self-contained garage door opening module inserted into and received at said receiving portion.

18. The interior rearview mirror assembly of claim 16, wherein said pivot portion of said retaining element comprises a pair of mounting arms that pivotally attach at said mirror casing.

19. The interior rearview mirror assembly of claim 16, wherein, with said portable self-contained garage door opening module inserted into and received at said receiving portion of said mirror head, said portable self-contained garage door opening module, responsive to actuation of said user input, wirelessly transmits a radio frequency signal to open a garage door, and wherein, with said portable self-contained garage door opening module removed from said receiving portion of said mirror head, said portable self-contained garage door opening module, responsive to actuation of said user input, wirelessly transmits the radio frequency signal to open the garage door.

20. An interior rearview mirror assembly for a vehicle, said interior rearview mirror assembly comprising:
- a mirror head comprising a mirror casing and a mirror reflective element;
- a mirror mounting structure configured to adjustably mount said mirror head at an interior portion of a vehicle equipped with said interior rearview mirror assembly;
- a receiving portion for receiving a portable self-contained garage door opening module;
- wherein said receiving portion is disposed at a lower region of said mirror casing when said interior rearview mirror assembly is mounted at the equipped vehicle, and wherein said receiving portion comprises an opening established through a wall of said mirror casing;
- wherein said portable self-contained garage door opening module comprises a user input and a housing that houses (i) garage door opener circuitry operable under rolling code, (ii) a radio frequency transmitter and (iii) a battery for electrically powering said circuitry, and wherein said portable self-contained garage door opening module is operable to wirelessly transmit a radio frequency signal responsive to actuation of said user input of said portable self-contained garage door opening module;
- wherein, with said portable self-contained garage door opening module received at said receiving portion of said interior rearview mirror assembly and with said mirror mounting structure mounted at the interior portion of the equipped vehicle, said user input is accessible by a driver of the equipped vehicle;
- a retaining element configured to attach at said mirror casing at said receiving portion;
- wherein said retaining element comprises a plastic element separate from said portable self-contained garage door opening module and having a portion that snap attaches at said lower region of said mirror casing;
- wherein, with said retaining element at least partially detached from said mirror casing, said portable self-contained garage door opening module is insertable into and removable from said receiving portion;
- wherein, with said portable self-contained garage door opening module inserted into and received at said receiving portion and with said retaining element attached at said mirror casing, said retaining element overlaps a lower portion of said portable self-contained garage door opening module to secure said portable self-contained garage door opening module at said receiving portion;
- wherein said portable self-contained garage door opening module comprises a light source that illuminates when said user input is actuated, and wherein, with said portable self-contained garage door opening module inserted into and received at said receiving portion and with said retaining element attached to secure said portable self-contained garage door opening module at said receiving portion, light emitted by said light source passes through said retaining element;
- wherein, with said portable self-contained garage door opening module inserted into and received at said receiving portion of said mirror head and with said retaining element attached to secure said portable self-contained garage door opening module at said receiving portion, said portable self-contained garage door opening module, responsive to actuation of said user input, wirelessly transmits a radio frequency signal to open a garage door; and
- wherein, with said portable self-contained garage door opening module removed from said receiving portion of said mirror head, said portable self-contained garage door opening module, responsive to actuation of said user input, wirelessly transmits the radio frequency signal to open the garage door.

21. The interior rearview mirror assembly of claim 20, wherein said retaining element comprises a compressible feature that engages said portable self-contained garage door opening module and compresses against said portable self-contained garage door opening module when said retaining element is snap attached at said lower region of said mirror casing with said portable self-contained garage door opening module inserted into and received at said receiving portion.

22. The interior rearview mirror assembly of claim 20, wherein said retaining element comprises an opaque portion and a translucent or transparent portion, and wherein, with said portable self-contained garage door opening module inserted into and received at said receiving portion and with said retaining element attached to secure said portable self-contained garage door opening module at said receiving portion, said translucent or transparent portion is disposed at said light source of said portable self-contained garage door opening module.

23. The interior rearview mirror assembly of claim 20, wherein said retaining element is configured to receive light emitted by a mirror light source accommodated by said interior rearview mirror assembly and wherein, when said mirror light source is activated, at least a portion of said retaining element is illuminated.

24. The interior rearview mirror assembly of claim 23, wherein said mirror light source accommodated by said interior rearview mirror assembly is activated responsive to a system of the vehicle and said retaining element is illuminated to alert a person viewing said retaining element.

25. The interior rearview mirror assembly of claim 23, wherein said mirror light source accommodated by said interior rearview mirror assembly is activated responsive to an ambient light sensor, and wherein said retaining element is illuminated when said mirror light source is activated to, with said mirror mounting structure mounted at the interior portion of the equipped vehicle, enhance awareness by the driver of the equipped vehicle of the presence of said portable self-contained garage door opening module releasably secured at said receiving portion in low lighting conditions.

26. The interior rearview mirror assembly of claim 23, wherein said mirror light source accommodated by said interior rearview mirror assembly comprises a light emitting diode disposed at a circuit board of said mirror head, and wherein a light pipe directs light emitted by said light emitting diode towards said retaining element.

* * * * *